United States Patent
Zhang et al.

(10) Patent No.: US 11,722,203 B2
(45) Date of Patent: Aug. 8, 2023

(54) BEAM PAIR SELECTION FOR FULL DUPLEX WITH DOWNLINK AND UPLINK RECEPTION TIMING CONSTRAINT

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US); Peter Gaal, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/445,329

(22) Filed: Aug. 18, 2021

(65) Prior Publication Data
US 2022/0069890 A1    Mar. 3, 2022

Related U.S. Application Data

(60) Provisional application No. 63/071,729, filed on Aug. 28, 2020.

(51) Int. Cl.
| | | |
|---|---|---|
| H04B 7/08 | (2006.01) | |
| H04B 17/336 | (2015.01) | |
| H04L 5/14 | (2006.01) | |
| H04B 7/06 | (2006.01) | |
| H04L 27/26 | (2006.01) | |
| H04L 5/00 | (2006.01) | |

(52) U.S. Cl.
CPC ........... *H04B 7/088* (2013.01); *H04B 17/336* (2015.01); *H04L 5/14* (2013.01)

(58) Field of Classification Search
CPC .... H04B 7/088; H04B 17/336; H04B 7/0695; H04L 5/14; H04L 27/2602; H04L 27/2607; H04L 5/0023
See application file for complete search history.

(56) References Cited

U.S. PATENT DOCUMENTS

| | | | | |
|---|---|---|---|---|
| 6,097,519 | A * | 8/2000 | Ford | H04J 14/02 398/1 |
| 10,054,661 | B1 * | 8/2018 | Rai | G01S 3/023 |
| 2006/0270434 | A1 * | 11/2006 | Iacono | H04B 7/0695 455/522 |
| 2007/0140177 | A1 * | 6/2007 | Li | H04B 7/088 370/335 |
| 2019/0123797 | A1 * | 4/2019 | Armand | H04B 7/0617 |
| 2019/0174337 | A1 * | 6/2019 | Prasad | H04W 24/04 |
| 2019/0245602 | A1 * | 8/2019 | Wang | H04L 25/021 |

\* cited by examiner

*Primary Examiner* — Harry H Kim
(74) *Attorney, Agent, or Firm* — Qualcomm Incorporated

(57) ABSTRACT

Certain aspects of the present disclosure provide techniques for beam pair selection. A method that may be performed by a user equipment (UE) includes receiving, from a base station (BS), an indication to report one or more beam pairs to be used for full-duplex (FD) communication based on a timing constraint, wherein the timing constraint comprises a constraint on a time difference between receptions, at the UE, of a downlink (DL) signal and an uplink (UL) signal for each of the one or more beam pairs and transmitting a report specifying the one or more beam pairs in accordance with the indication, in accordance with aspects of the present disclosure.

30 Claims, 18 Drawing Sheets

BEAM PAIR SELECTION FOR FULL DUPLEX WITH DOWNLINK AND UPLINK RECEPTION TIMING CONSTRAINT

CROSS-REFERENCE TO RELATED APPLICATION

This application claims benefit of and priority to U.S. Provisional Application No. 63/071,729 filed Aug. 28, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for full-duplex (FD) communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved full-duplex (FD) communication.

Certain aspects of the subject matter described in this disclosure can be implemented in a method for wireless communication by a user equipment (UE). The method generally includes determining whether reporting of one or more beam pairs to be used for FD communication is to be based on a timing constraint, wherein the timing constraint comprises a constraint on a time difference between receptions, at the UE, of a downlink (DL) signal and an uplink (UL) signal for each of the one or more beam pairs; and reporting the one or more beam pairs in accordance with the determination.

Certain aspects of the subject matter described in this disclosure can be implemented in a method for wireless communication by a base station (BS). The method generally includes determining whether reporting of one or more beam pairs to be used for FD communication is to be based on a timing constraint, wherein the timing constraint comprises a constraint on a time difference between receptions, at a UE, of a DL signal and a UL signal for each of the one or more beam pairs; indicating a configuration for the reporting of the one or more beam pairs in accordance with the determination; and receiving at least one report of the one or more beam pairs in accordance with the configuration.

Certain aspects of the subject matter described in this disclosure can be implemented in a method for wireless communication by a UE. The method generally includes receiving, from a BS, an indication to report one or more beam pairs to be used for FD communication based on a timing constraint, wherein the timing constraint comprises a constraint on a time difference between receptions, at the UE, of a DL signal and a UL signal for each of the one or more beam pairs; and transmitting a report specifying the one or more beam pairs in accordance with the indication.

Certain aspects of the subject matter described in this disclosure can be implemented in a method for wireless communication by a BS. The method generally includes transmitting, to a UE, a configuration to report one or more beam pairs to be used for FD communication based on a timing constraint, wherein the timing constraint comprises a constraint on a time difference between receptions, at the UE, of a DL signal and a UL signal for each of the one or more beam pairs; and receiving at least one report specifying the one or more beam pairs in accordance with the configuration.

Certain aspects of the subject matter described in this disclosure can be implemented in an apparatus for wireless communication by a UE. The apparatus generally includes a memory, and one or more processors coupled to the memory, the one or more processors and the memory being configured to: determine whether reporting of one or more beam pairs to be used for FD communication is to be based on a timing constraint, wherein the timing constraint comprises a constraint on a time difference between receptions, at the UE, of a DL signal and a UL signal for each of the one or more beam pairs; and report the one or more beam pairs in accordance with the determination.

Certain aspects of the subject matter described in this disclosure can be implemented in an apparatus for wireless communication by a BS. The apparatus generally includes a memory, and one or more processors coupled to the memory, the one or more processors and the memory being configured to: determine whether reporting of one or more beam pairs to be used for FD communication is to be based on a timing constraint, wherein the timing constraint comprises a constraint on a time difference between receptions, at a UE, of a DL signal and a UL signal for each of the one or more beam pairs; indicate a configuration for the reporting of the one or more beam pairs in accordance with the determination; and receive at least one report of the one or more beam pairs in accordance with the configuration.

Certain aspects of the subject matter described in this disclosure can be implemented in an apparatus for wireless communication by a UE. The apparatus generally includes a memory, and one or more processors coupled to the memory, the one or more processors and the memory being configured to: receive, from a BS, an indication to report one or more beam pairs to be used for FD communication based on a timing constraint, wherein the timing constraint comprises a constraint on a time difference between receptions, at the UE, of a DL signal and a UL signal for each of the one or more beam pairs; and transmit a report specifying the one or more beam pairs in accordance with the indication.

Certain aspects of the subject matter described in this disclosure can be implemented in an apparatus for wireless communication by a BS. The apparatus generally includes a memory, and one or more processors coupled to the memory, the one or more processors and the memory being configured to: transmit, to a UE, a configuration to report one or more beam pairs to be used for FD communication based on a timing constraint, wherein the timing constraint comprises a constraint on a time difference between receptions, at the UE, of a DL signal and a UL signal for each of the one or more beam pairs; and receive at least one report specifying the one or more beam pairs in accordance with the configuration Certain aspects of the subject matter described in this disclosure can be implemented in an apparatus for wireless communication by a UE. The apparatus generally includes means for determining whether reporting of one or more beam pairs to be used for FD communication is to be based on a timing constraint, wherein the timing constraint comprises a constraint on a time difference between receptions, at the UE, of a DL signal and a UL signal for each of the one or more beam pairs; and means for reporting the one or more beam pairs in accordance with the determination.

Certain aspects of the subject matter described in this disclosure can be implemented in an apparatus for wireless communication by a BS. The apparatus generally includes means for determining whether reporting of one or more beam pairs to be used for FD communication is to be based on a timing constraint, wherein the timing constraint comprises a constraint on a time difference between receptions, at a UE, of a DL signal and a UL signal for each of the one or more beam pairs; means for indicating a configuration for the reporting of the one or more beam pairs in accordance with the determination; and means for receiving at least one report of the one or more beam pairs in accordance with the configuration.

Certain aspects of the subject matter described in this disclosure can be implemented in an apparatus for wireless communication by a UE. The apparatus generally includes means for receiving, from a BS, an indication to report one or more beam pairs to be used for FD communication based on a timing constraint, wherein the timing constraint comprises a constraint on a time difference between receptions, at the UE, of a DL signal and a UL signal for each of the one or more beam pairs; and means for transmitting a report specifying the one or more beam pairs in accordance with the indication.

Certain aspects of the subject matter described in this disclosure can be implemented in an apparatus for wireless communication by a BS. The apparatus generally includes means for transmitting, to a UE, a configuration to report one or more beam pairs to be used for FD communication based on a timing constraint, wherein the timing constraint comprises a constraint on a time difference between receptions, at the UE, of a DL signal and a UL signal for each of the one or more beam pairs; and means for receiving at least one report specifying the one or more beam pairs in accordance with the configuration.

Certain aspects of the subject matter described in this disclosure can be implemented in a computer-readable medium having instructions stored thereon to cause a UE to: determine whether reporting of one or more beam pairs to be used for FD communication is to be based on a timing constraint, wherein the timing constraint comprises a constraint on a time difference between receptions, at the UE, of a DL signal and a UL signal for each of the one or more beam pairs; and report the one or more beam pairs in accordance with the determination.

Certain aspects of the subject matter described in this disclosure can be implemented in a computer-readable medium having instructions stored thereon to cause a BS to: determine whether reporting of one or more beam pairs to be used for FD communication is to be based on a timing constraint, wherein the timing constraint comprises a constraint on a time difference between receptions, at a UE, of a DL signal and a UL signal for each of the one or more beam pairs; indicate a configuration for the reporting of the one or more beam pairs in accordance with the determination; and receive at least one report of the one or more beam pairs in accordance with the configuration.

Certain aspects of the subject matter described in this disclosure can be implemented in a computer-readable medium having instructions stored thereon to cause a UE to: receive, from a BS, an indication to report one or more beam pairs to be used for FD communication based on a timing constraint, wherein the timing constraint comprises a constraint on a time difference between receptions, at the UE, of a DL signal and a UL signal for each of the one or more beam pairs; and transmit a report specifying the one or more beam pairs in accordance with the indication.

Certain aspects of the subject matter described in this disclosure can be implemented in a computer-readable medium having instructions stored thereon to cause a BS to: transmit, to a UE, a configuration to report one or more beam pairs to be used for FD communication based on a timing constraint, wherein the timing constraint comprises a constraint on a time difference between receptions, at the UE, of a DL signal and a UL signal for each of the one or more beam pairs; and receive at least one report specifying the one or more beam pairs in accordance with the configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
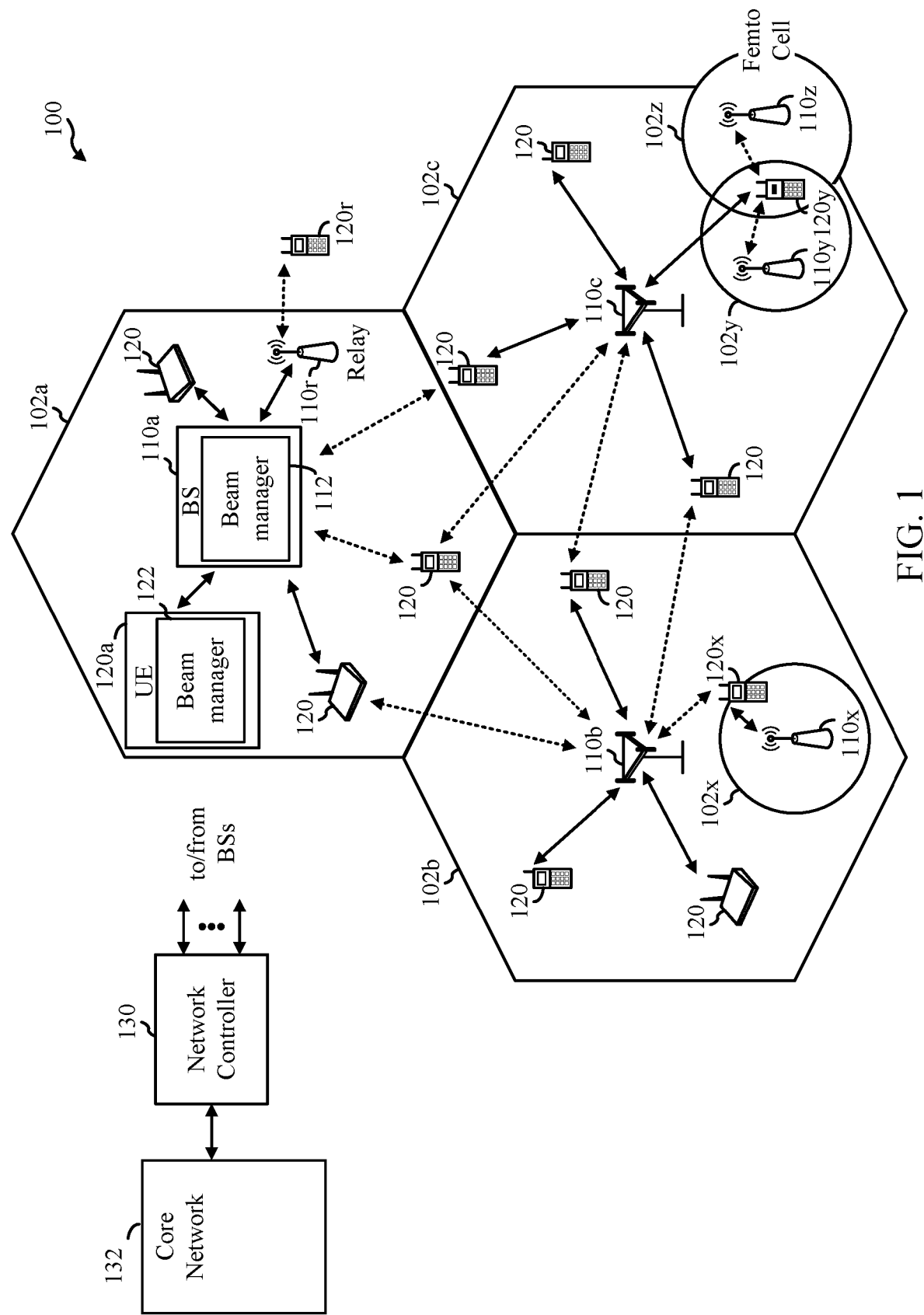
FIG. 1 is a block diagram conceptually illustrating an example telecommunications system, in accordance with certain aspects of the present disclosure.

Aspects of the present disclosure provide apparatus, methods, processing systems, and computer-readable mediums for beam pair selection in a manner that reduces self-interference (SI) at a user equipment (UE). A common challenge of full-duplex (FD) communication at a UE is SI, or transmitter leakage, which refers to an uplink (UL) signal that leaks from the UE's transmitter to the UE's receiver thereby causing decoding issues with a desired downlink (DL) signal. Such leakage in FD transmissions at the UE, however, may be avoided (or at least mitigated) by the alignment of DL and UL timing. Accordingly, certain aspects of the present disclosure are directed to techniques for reducing SI with timing alignment associated with FD communication at a UE by considering a timing constraint when selecting a beam pair for DL and UL transmissions for the FD communication.

For example, when selecting beam pairs to be reported to a base station (BS), a UE may also consider a timing constraint associated with each beam pair. The timing constraint may include a constraint on a time difference between receptions of DL and UL signals at the UE for FD transmissions. For instance, the UE may select beam pairs that have a time difference between the reception of DL and UL signals that is less than a cyclic prefix (CP) duration of a symbol on which the DL and UL signals are transmitted. Meeting this constraint on the time difference between receptions of DL and UL signals may facilitate orthogonal frequency division multiplexed (OFDM) symbol orthogonality between the receptions of the DL and UL signals, thereby reducing SI and improving FD communication.

The following description provides examples of beam pair selection in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more BSs 110 and/or UEs 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for beam selection. As shown in FIG. 1, the UE 120a includes a beam manager 122. Beam manager 122 may be configured for determining whether reporting of one or more beam pairs to be used for FD communication is to be based on a timing constraint, wherein the timing constraint comprises a constraint on a time difference between receptions, at the UE, of a DL signal and a UL signal for each of the one or more beam pairs and reporting the one or more beam pairs in accordance with the determination, in accordance with certain aspects of the present disclosure. Similarly, BS 110 may also include a beam manager 112. Beam manager 112 may be configured for determining whether reporting of one or more beam pairs to be used for FD communication is to be based on a timing constraint, wherein the timing constraint comprises a constraint on a time difference between receptions, at a UE, of a DL signal and a UL signal for each of the one or more beam pairs, indicating a configuration for the reporting of the one or more beam pairs in accordance with the determination, and receiving at least one report of the one or more beam pairs in accordance with the configuration, in accordance with certain aspects of the present disclosure.

Figure 2:
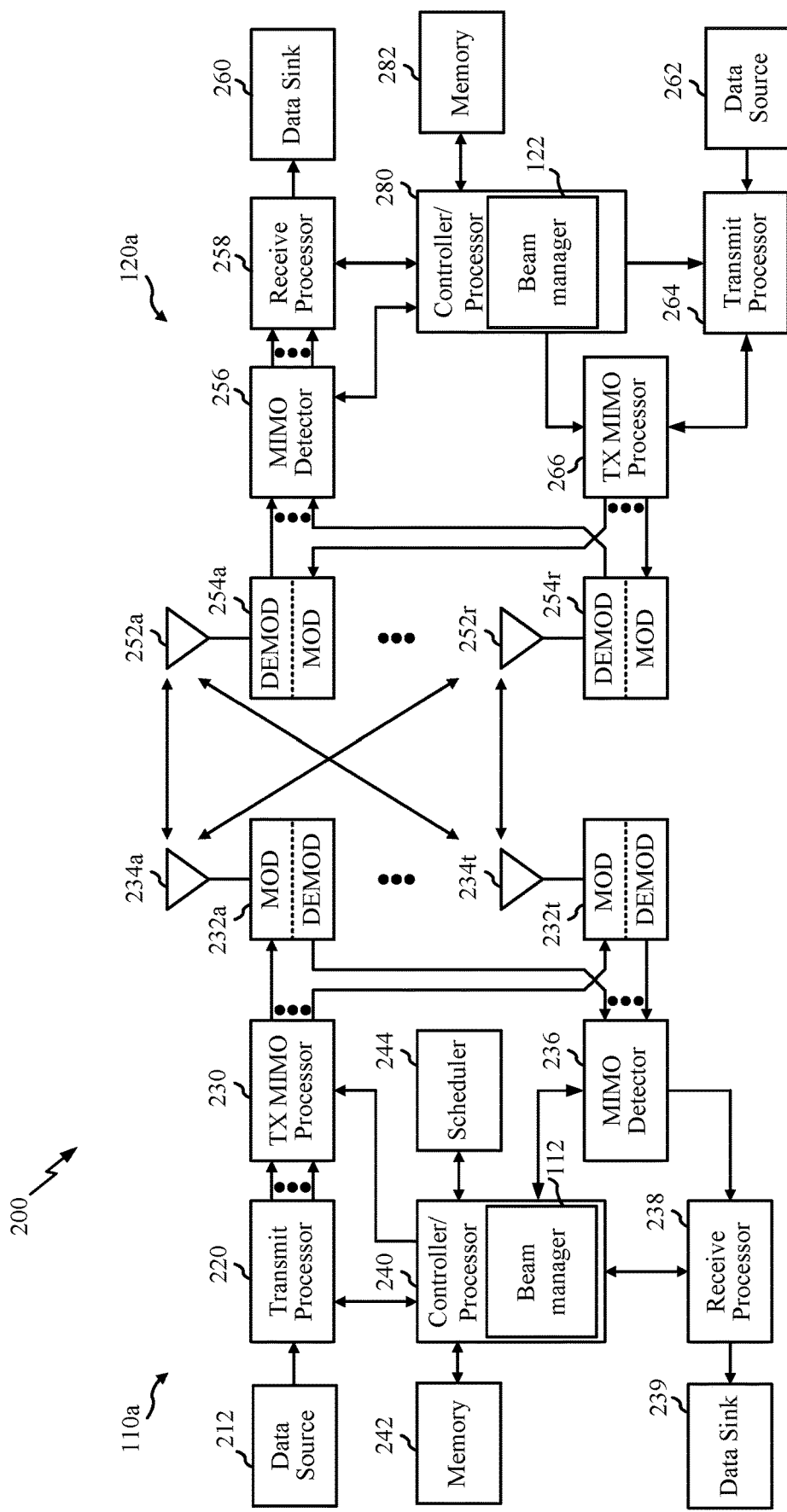
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in wireless communication network 100 of FIG. 1), which may be used to implement aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), and channel state information reference signal (CSI-RS). A transmit (TX) MIMO processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. DL signals from modulators in transceivers 232a-232t may be transmitted via the antennas 234a-234t, respectively.

At UE 120a, antennas 252a-252r may receive the DL signals from BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the UL, at UE 120a, a transmit processor 264 may receive and process data (e.g., for the PUSCH) from a data source 262 and control information (e.g., for the physical uplink control channel (PUCCH)) from controller/processor 280. Transmit processor 264 may also generate reference symbols for a reference signal (RS) (e.g., for the sounding reference signal (SRS)). The symbols from transmit processor 264 may be precoded by a TX MIMO processor 266 if applicable, further processed by the modulators (MODs) in transceivers 254a-254r (e.g., for single-carrier frequency division multiplexing (SC-FDM), etc.), and transmitted to BS 110a. At BS 110a, the UL signals from UE 120a may be received by antennas 234, processed by the modulators in transceivers 232a-232t, detected by a MIMO detector 236 if applicable, and further processed by a receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. As shown in FIG. 2, controller/processor 280 of UE 120a includes beam manager 122, according to certain aspects described herein. Controller/processor 240 may include beam manager 112. Although shown at the controller/processor 240 and 280, other components of UE 120a and BS 110a may be used to perform the operations described herein.

NR may utilize OFDM with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into sub-bands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

Figure 3:
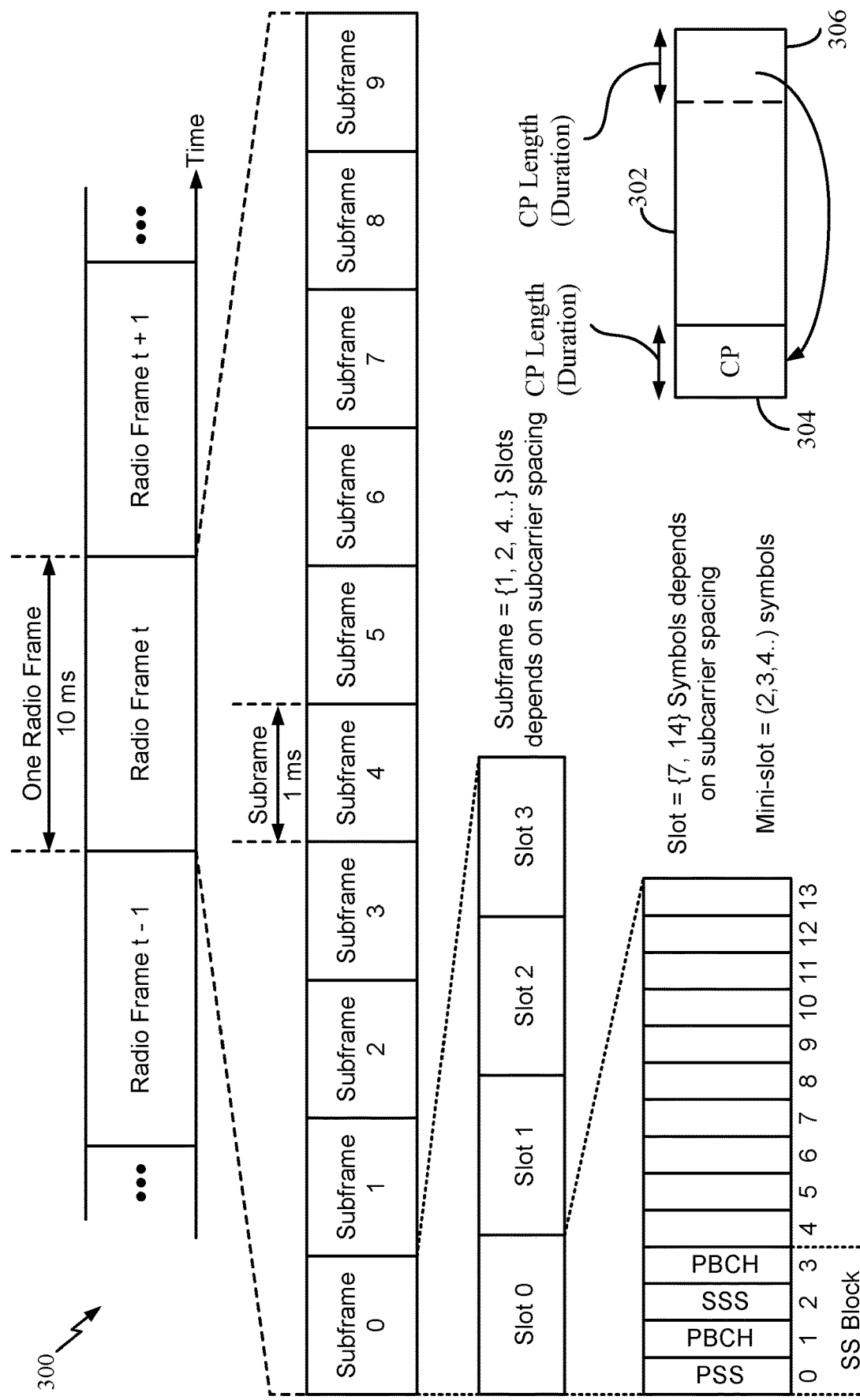
FIG. 3 is an example frame format for new radio (NR), in accordance with certain aspects of the present disclosure.

FIG. 3 is a diagram showing an example of a frame format 300 for NR, in accordance with certain aspects of the present disclosure. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a TTI having a duration less than a slot (e.g., 2, 3, or 4 symbols). Each symbol in a slot may indicate a link direction (e.g., DL, UL, or flexible) for data transmission, and the link direction for each subframe may be dynamically switched. The link directions may be based on the slot format. Each slot may include DL/UL data as well as DL/UL control information.

As illustrated, each symbol (e.g., symbol 302) may be implemented using a CP (e.g., CP 304). A CP may be implemented to combat intersymbol interference (ISI). A CP refers to the cyclic extension of a symbol 302 and is implemented by appending the last samples 306 of the symbol to the front of the symbol, as illustrated. Further, as illustrated, a CP may have a CP length (also referred to as a CP duration). The CP duration may be chosen to accommodate a delay spread caused by a multipath channel (e.g., a channel with multipath propagation, where multipath propagation occurs when a signal takes two or more paths from a transmitting antenna to a receiving antenna). For example, if the CP duration is greater than the delay spread of the channel, then the received OFDM signal may not suffer from any ISI. A delay spread is a measure of the multipath profile of the channel and may be defined as the difference between the time of arrival (ToA) of the earliest component and the ToA of the latest multipath component.

Example Full-Duplex (FD) Communication

Figure 4A:
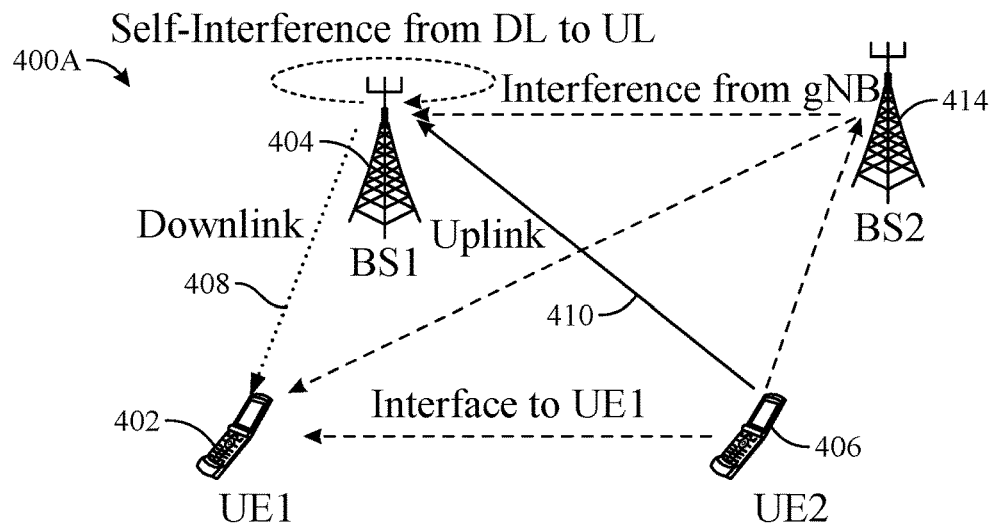
FIGS. 4A-4C are diagrams of example full-duplex (FD) communication deployments, in accordance with certain aspects of the present disclosure.
Figure 4B:
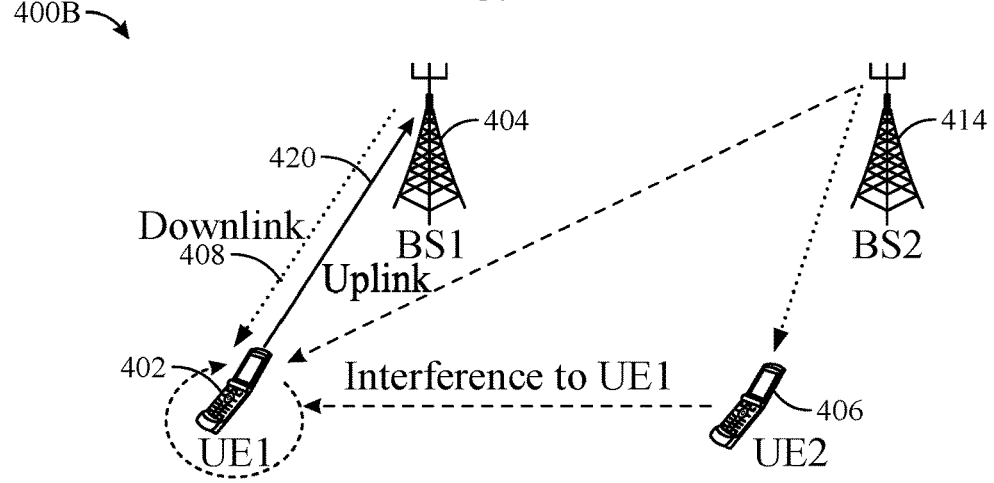
Figure 4C:
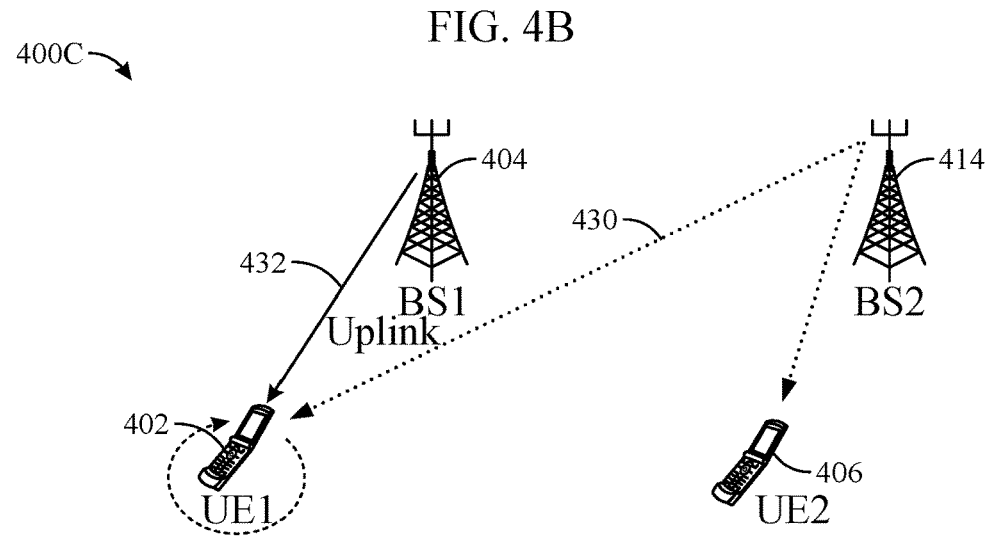

FIGS. 4A-4C are diagrams of example full-duplex (FD) communication (also referred to herein as FD operations or FD mode of operation) deployments, in accordance with certain aspects of the present disclosure. FD communication is the ability to transmit and receive simultaneously in the same spectrum band, while in half-duplex (HD) communication, the ability to communicate (e.g., transmit and receive) is not simultaneous, e.g., HD communication provides a two-way directional communication but with communication in one direction at a time. As used herein, FD communication generally refers to any communication type where UL and DL transmissions overlap in the time domain, such as FD and flexible-duplex communications.

FIG. 4A illustrates a deployment 400A including an FD base station (BS) and an HD user equipment (UE). As illustrated, a UE 402 (e.g., HD UE) may receive a DL transmission 408 from a BS 404 (e.g., FD BS), while another UE 406 may send a UL transmission 410 to the same BS 404. UL transmission 410 and the DL transmission 408 may overlap in the time domain. BS 404, operating in an FD mode, may thus experience self-interference from DL transmission 408 to the reception by BS 404 of UL transmission 410. Further, as shown, UE 402 may experience interference from UE 406 and another BS 414, and BS 404 may experience interference from BS 414.

FIG. 4B illustrates a deployment 400B including an FD BS and an FD UE. As illustrated, UE 402 may receive a DL transmission 408 from BS 404 and transmit a UL transmission 420 to the same BS 404. Thus, both UE 402 and BS 404 are operating in FD mode. UE 402 may experience self-interference from UL transmission 420 to the reception by the UE 402 of DL transmission 408. In other words, UL transmission 420 may cause interference and prevent proper reception and decoding of DL transmission 408. Further, as shown, UE 402 may experience interference from UE 406 and BS 414, while UE 406 is receiving DL transmissions from BS 414.

FIG. 4C illustrates a deployment 400C including an FD UE with multi-transmission/reception point (TRP) communication. UE 402 may receive a DL transmission 430 from BS 414 and transmit a UL transmission 432 to BS 404. DL transmission 430 and UL transmission 432 may overlap in the time-domain. Thus, UE 402 may be operating in FD mode. UE 402 may experience self-interference from UL transmission 432 to the reception by UE 402 of DL transmission 430. In other words, UL transmission 420 may cause interference and prevent proper reception and decoding of DL transmission 408. Further, as shown, UE 406 may receive DL transmissions from BS 414.

Figure 5A:
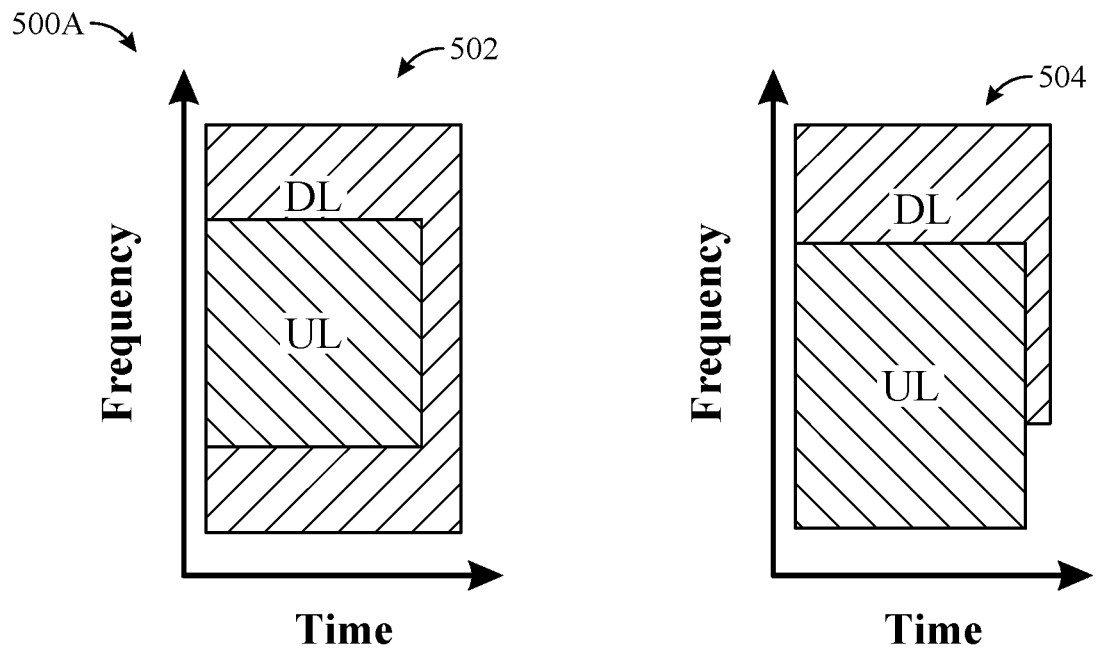
FIGS. 5A-5B illustrate example time and frequency resources for uplink (UL) and downlink (DL) during FD operations, in accordance with certain aspects of the present disclosure.
Figure 5B:
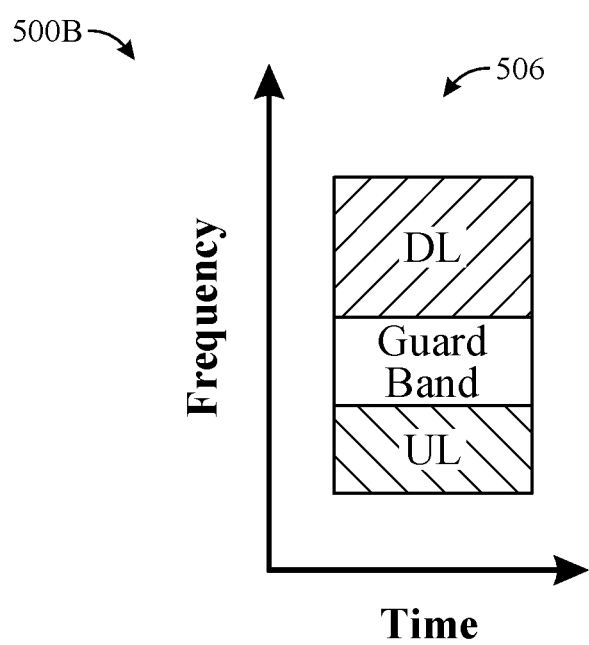

FIGS. 5A-5B illustrate example time and frequency resources 500A, 500B for UL and DL transmissions during FD operations, in accordance with certain aspects of the present disclosure. As illustrated in FIG. 5A, which depicts an in-band FD (IBFD) operation, UL and DL transmissions may be on the same time and/or frequency resources. As shown, in both of spectrums 502, 504, the UL and DL transmissions may be partially overlapped in time and/or frequency. For example, as shown in spectrum 502, the UL transmission may fully overlap with the DL transmission, or as shown in spectrum 504, the UL transmission may partially overlap with the DL transmission. Although not shown, the UL and DL transmissions may be completely overlapped in time and/or frequency, in some implementations.

As illustrated in FIG. 5B, which depicts sub-band frequency division duplex (FDD) (e.g., also referred to as "flexible-duplex"), UL and DL transmissions may occur at the same time (e.g., overlap in the time domain), but in different frequency resources. As illustrated in spectrum 506, the DL resource may be separated from the UL resource in the frequency domain by a guard band (e.g., used to help prevent interference). While the UL and DL transmissions are separated by a guard band, the UL and DL transmissions are scheduled within the same frequency band and are scheduled close together in the frequency domain. Therefore, the UL transmission may cause interference with the DL transmission, the severity of which being dependent on the adjacent channel leakage ratio (ACLR) associated with the UL transmission.

While certain examples provided herein may be described with respect to an FD operation to facilitate understanding, the aspects described herein are applicable to any scenario where UL and DL transmissions overlap in the time domain, such as in FD and flexible-duplex implementations, as described.

Figure 6:
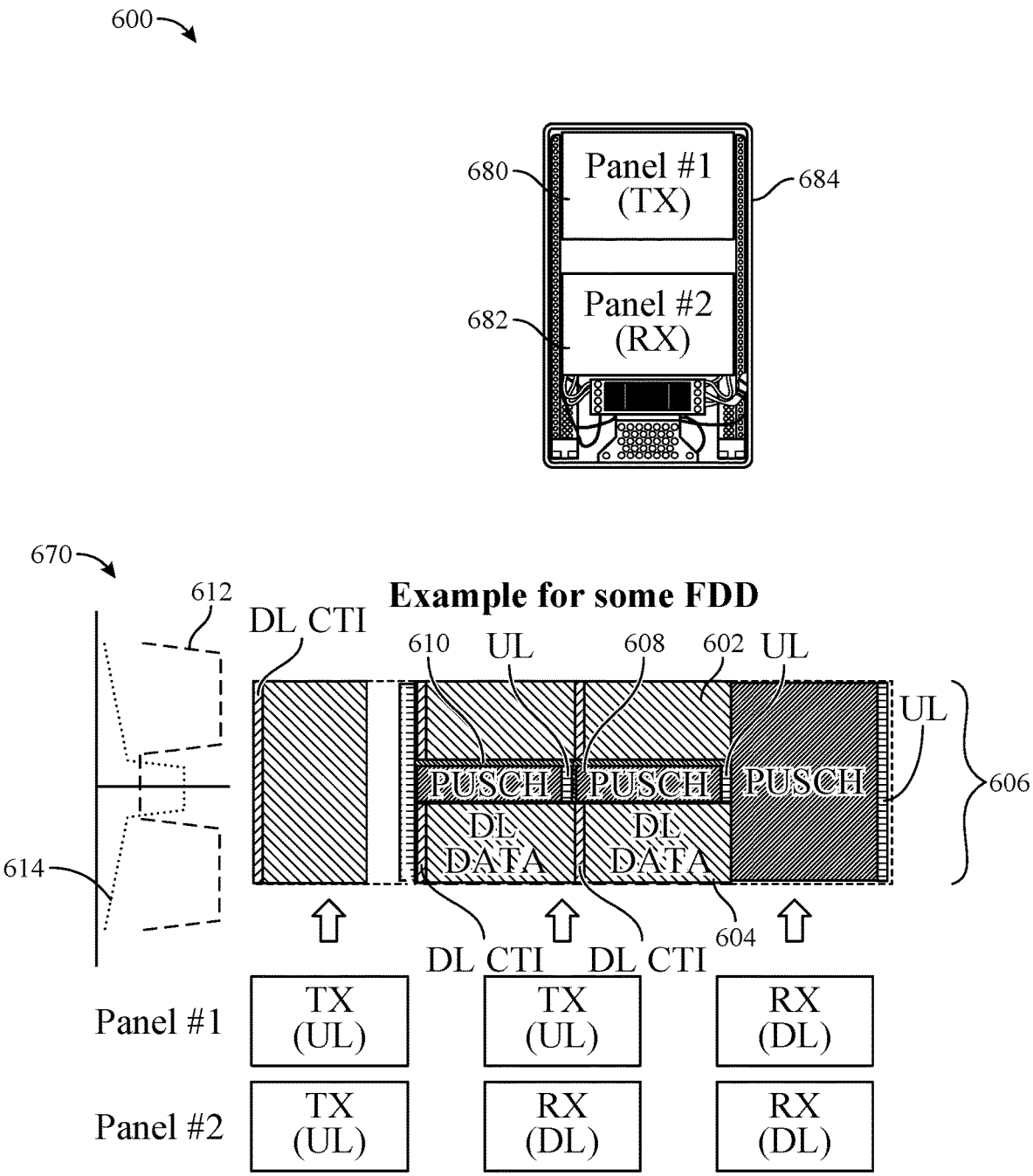
FIG. 6 illustrates an example architecture for FD operation, in accordance with certain aspects of the present disclosure.

FIG. 6 is an example implementation 600 for flexible-duplex operation, in accordance with certain aspects of the present disclosure. As shown, a UE 684 (e.g., corresponding to UE 120a illustrated in FIGS. 1 and 2) may include two separate antenna panels 680, 682 for simultaneous transmission and reception operations. For example, antenna panel 680 may be for DL transmissions (e.g., DL data) at both edges 602, 604 of a band 606, while antenna panel 682 may be for UL transmissions (e.g., of a physical uplink shared channel (PUSCH)) at a center 608 of the band 606. As shown, the DL transmissions (e.g., DL reception from the perspective of UE 684) and UL transmissions may be in different portions of the band, with a guard band 610 between the UL and DL resources.

Diagram 670 illustrates a power spectral density (PSD) 612 for the DL transmission, and a PSD 614 for the UL transmission. As shown, the power from the UL transmission may leak into the frequency resources allocated for the DL transmission due to the ACLR associated with the UL transmission, causing self-interference (SI). In some implementations, different beams may be used for UL and DL transmissions. In this case, the power from a UL transmission on the UL beam may leak into a DL beam for the DL transmission, causing SI.

FD communication that supports simultaneous transmission and reception at either a BS, a UE or both, provides various benefits such as reduction of latency by making it possible to receive DL signals in UL only slots, or vice versa. FD communication may also enhance spectrum efficiency (e.g., per cell or per UE), and provide for a more efficient resource utilization.

Example Techniques for Beam Pair Selection for Full-Duplex (FD) Communication

Figure 7:
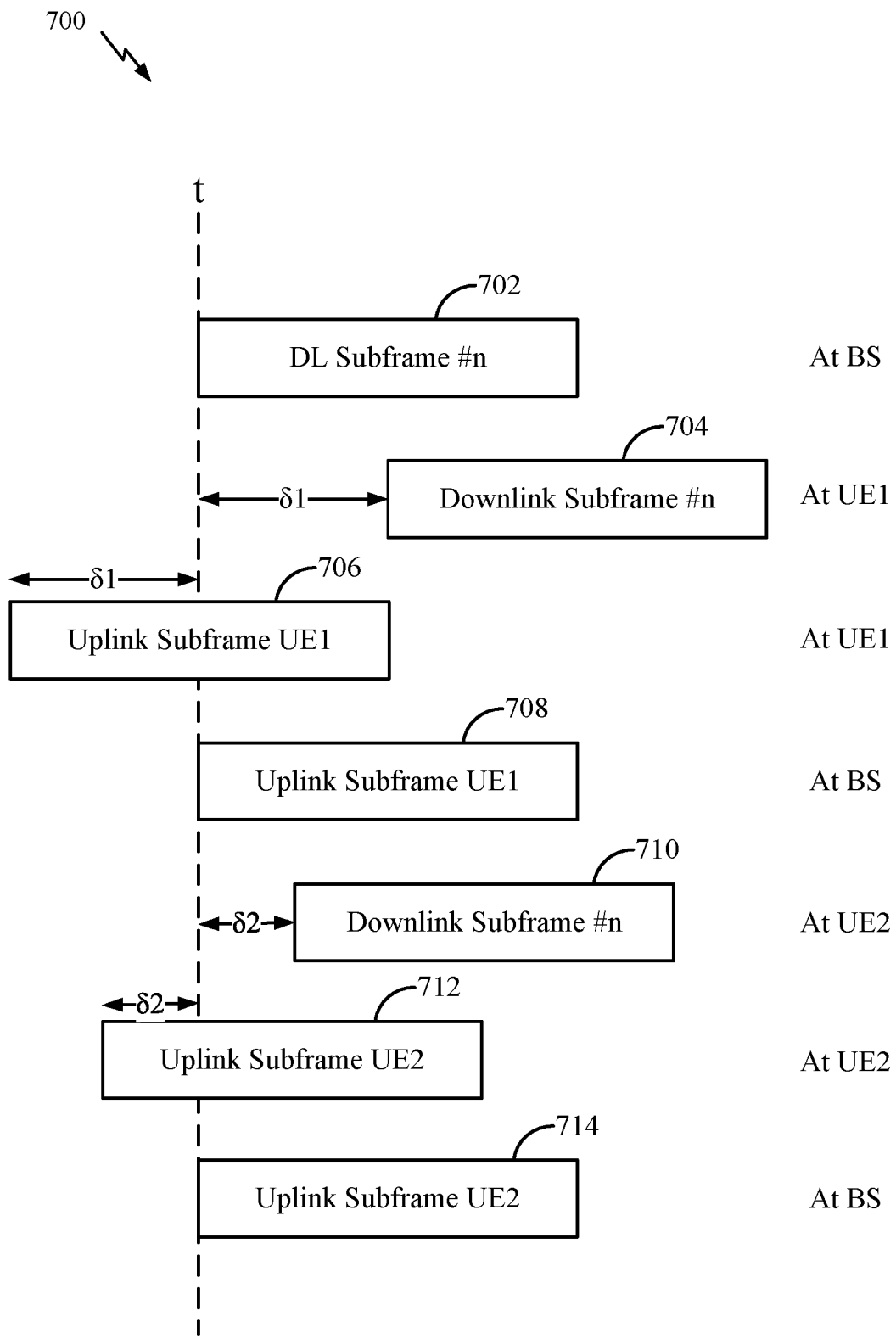
FIG. 7 illustrates a timing advance (TA) at different UEs, in accordance with certain aspects of the present disclosure.

FIG. 7 illustrates a timing advance (TA) 700 at different user equipments (UEs) (e.g., UE1 and UE2). A TA is a negative offset, at a UE, between the start of a received downlink (DL) subframe and a transmitted uplink (UL) subframe. For example, a DL subframe transmission 702 at a BS may be received by a UE (UE1) after a propagation delay $\delta1$, as shown by DL subframe reception 704. The TA at the UE may be used to transmit signals such that the DL and UL subframes are synchronized (e.g., are received at about the same time) at the base station (BS). As used herein, transmission and reception of signals, at a wireless node, are considered to occur at the same time or at (slightly) different times with a delta difference. The delta difference may be dependent on UL transmission and it may be dependent on a configuration for a TA value in a TA command (e.g., configured by a BS). As illustrated, the propagation delay $\delta1$ of a UL or DL subframe for UE 1 may be greater than the propagation delay $\delta2$ of a UL or DL subframe for UE 2. For example, DL subframe reception 710 at UE2 may occur after a propagation delay $\delta2$. This may be due to UE1 being further from the BS than UE2.

A TA of a UE may be set to be twice the propagation delay assuming that the same propagation delay applies to both DL and UL. In this manner, UL transmissions from different UEs (e.g., UE1 and UE2) may reach the BS at the same time such that both UL and DL subframes are time aligned at the BS. For example, UL subframe transmission 706 at UE1 may occur at twice the propagation delay $\delta1$ prior to DL reception time (time of the DL subframe reception 704) such that UL subframe transmission 706 is received at the BS at time t, as shown by UL subframe reception 708. Similarly, UL subframe transmission 712 at UE2 may occur at twice the propagation delay $\delta2$ prior to DL reception time (time of DL subframe reception 710) such that UL subframe transmission 712 is received at the BS at time t1, as shown by UL subframe reception 714.

SI/transmitter leakage at a UE generally refers to a UL signal that leaks from the UE's transmitter to its receiver thereby causing decoding issues with a desired DL signal; however, such leakage in full-duplex (FD) transmissions may be avoided (or at least mitigated) by the alignment of DL and UL timing, such as DL and UL timing illustrated in FIG. 7. Where FD is used at a BS, the TA procedure described with respect to FIG. 7 may be followed to align timing. Certain aspects of the present disclosure are directed to techniques for reducing SI (or inter-symbol interference (ISI))/leakage with timing alignment associated with FD communication at a UE by considering a timing constraint when selecting a beam pair for DL and UL transmissions for the FD communication, as described in more detail herein.

Figure 8:
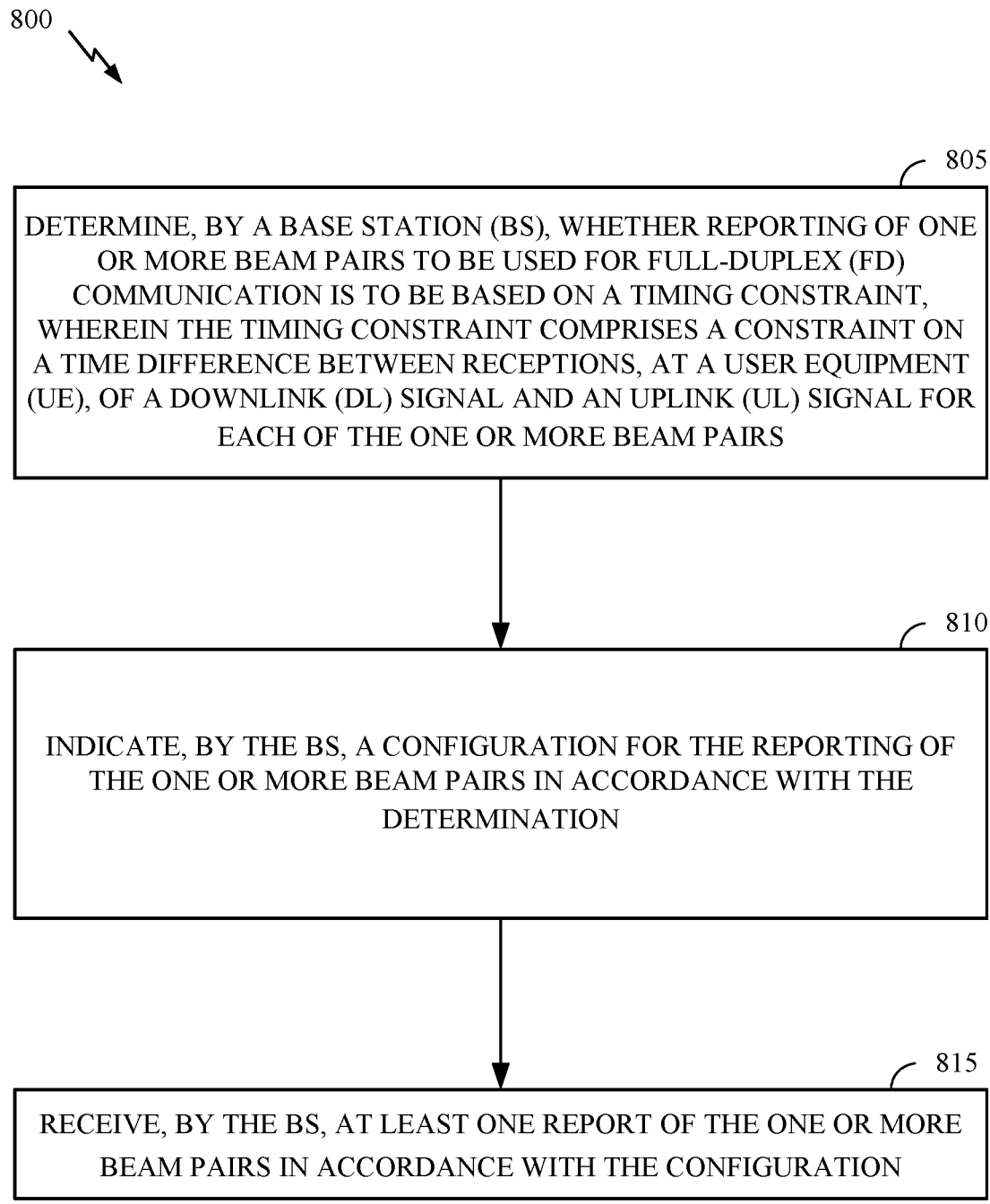
FIG. 8 is a flow diagram illustrating example operations for wireless communication by a BS, in accordance with certain aspects of the present disclosure.

FIG. 8 is a flow diagram illustrating example operations 800 for wireless communication by a BS, in accordance with certain aspects of the present disclosure. Operations 800 may be performed, for example, by BS 110a in the wireless communication network 100 of FIG. 1.

Operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 800 begin, at block 805, by the BS transmitting, to a UE, a configuration to report one or more beam pairs to be used for FD communication based on a timing constraint. The timing constraint may include a constraint on a time difference between receptions, at the UE, of a DL signal and a UL signal for each of the one or more beam pairs. At block 810, the BS receives at least one report specifying the one or more beam pairs in accordance with the configuration.

Figure 9:
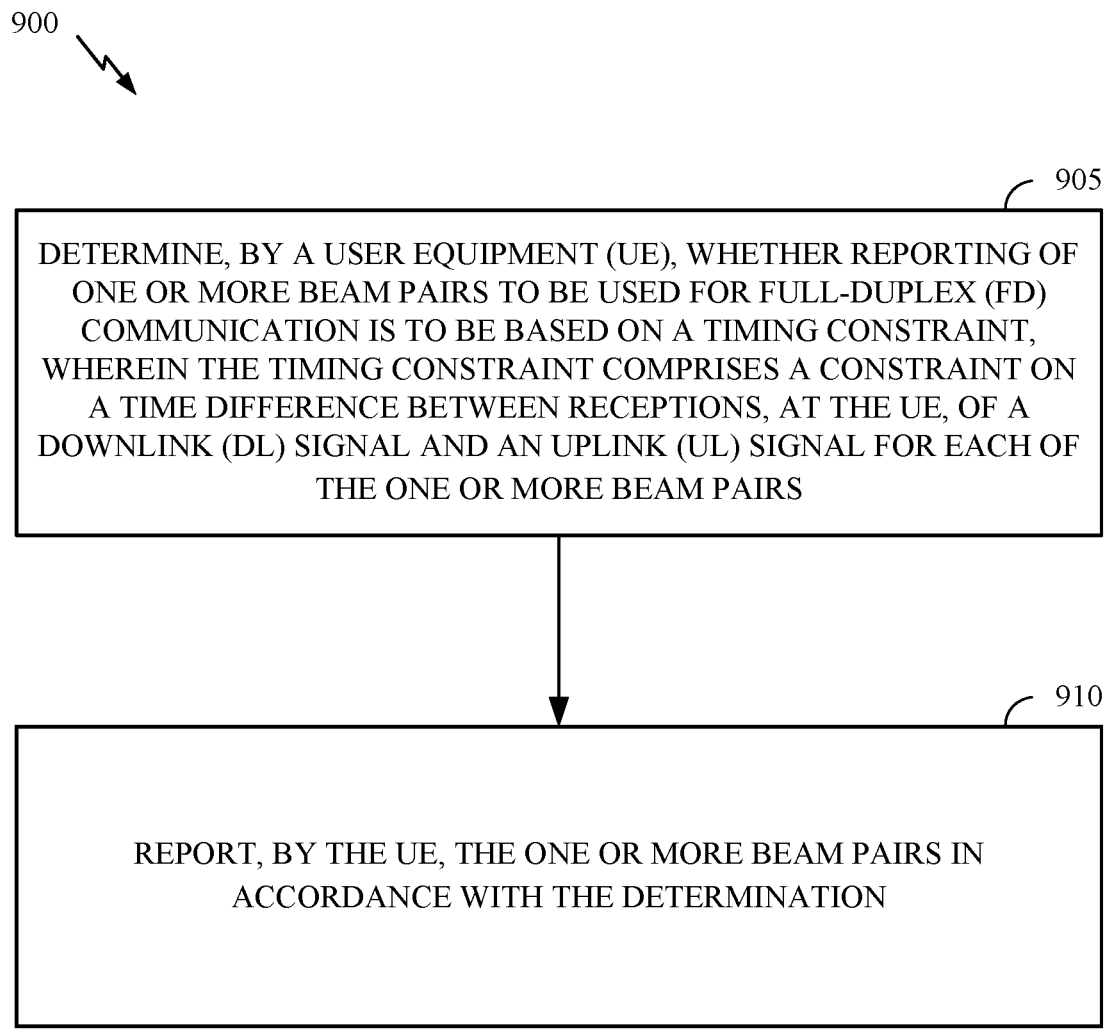
FIG. 9 is a flow diagram illustrating example operations for wireless communication by a UE, in accordance with certain aspects of the present disclosure.

FIG. 9 is a flow diagram illustrating example operations 900 for wireless communication by a UE, in accordance with certain aspects of the present disclosure. Operations 900 may be performed, for example, by UE 120a in the wireless communication network 100 of FIG. 1. Operations 900 may be complementary operations by the UE to the operations 800 performed by the BS.

Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 900 begin, at block 905, with the UE receiving, from a BS, and indication to report one or more beam pairs to be used for FD communication based on a timing constraint. The timing constraint may include a constraint on a time difference between receptions, at the UE, of a DL signal and a UL signal for each of the one or more beam pairs. At block 910, the UE transmits a report specifying the one or more beam pairs in accordance with the indication.

Figure 10A:
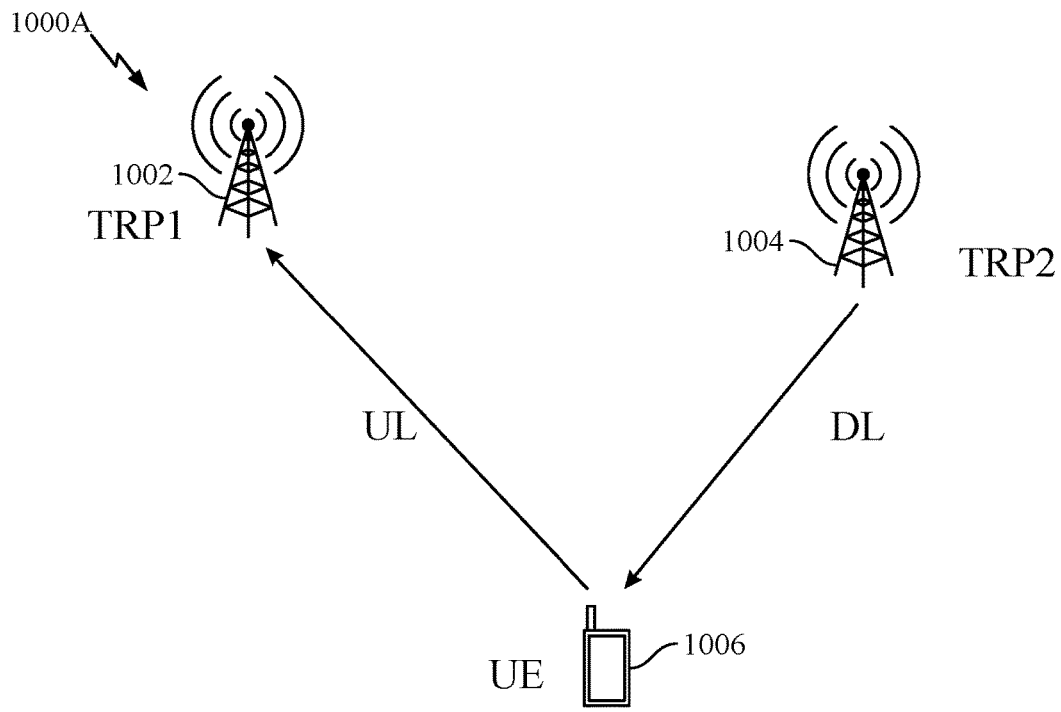
FIG. 10A illustrates a DL signal transmission from a transmission reception point (TRP) to a UE and a UL signal transmission from the UE to another TRP, in accordance with certain aspects of the present disclosure.

FIG. 10A illustrates transmissions 1000A including a DL signal transmission from a transmission reception point (TRP) 1004 to a UE 1006 and a UL signal transmission from the UE 1006 to a TRP 1002, in accordance with certain aspects of the present disclosure. The DL and UL signals may be transmitted on the same symbol (e.g., symbol #n) and communicated using an FD communication technique. In other words, the UL and DL symbols transmissions may overlap in the time domain. In some cases, TRPs 1002, 1004 may be different panels of a single BS.

Figures 10B, 10C:
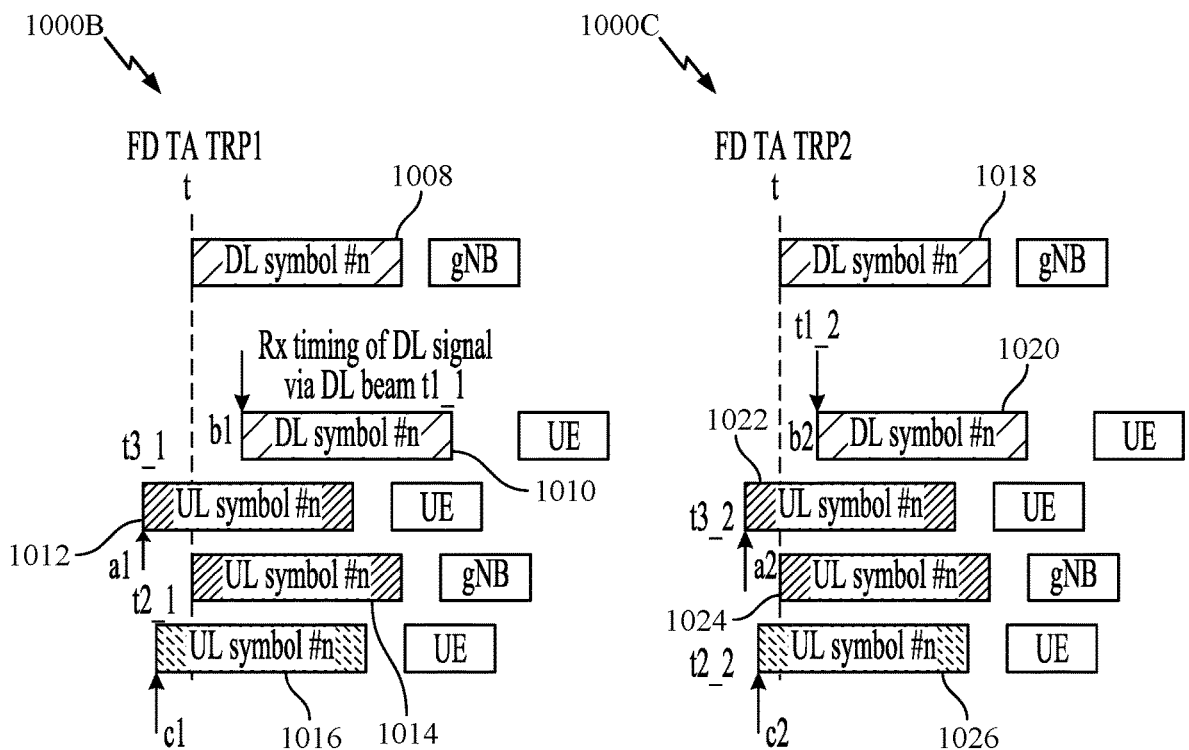
FIGS. 10B and 10C illustrate example timing receptions, at a UE, of a DL signal and a UL signal, in accordance with certain aspects of the present disclosure.

FIGS. 10B and 10C illustrate example timing receptions 1000B, 1000C, at a UE, of a DL signal and a UL signal, in accordance with certain aspects of the present disclosure. In particular, FIG. 10B illustrates a DL signal transmission 1008 from TRP 1002 (TRP1) via a DL beam at time t. As illustrated, DL signal transmission 1008 may be received by UE 1006 at time t1_1, as shown by DL signal reception 1010. Thus, there may be a propagation delay b1 from DL signal transmission 1008 and DL signal reception 1010. FIG. 10B also illustrates a UL signal transmission 1012 via a UL beam transmitted at time t3_1 which is a time period a1 before time t1. Generally, a1 may be equal to b1 if DL and UL transmissions have the same propagation delay.

The timing of UL signal transmission 1012 (e.g., time t3_1) via a UL beam may be set based on a received TA (e.g., received via radio access response (RAR) message of a random access channel (RACH) procedure). As illustrated, UL signal transmission 1012 may be received by TRP 1002 at time t, as shown by UL signal reception 1014. UL signal transmission 1012 may also be received by UE 1006 at time t2_1 via near field leakage or via a clutter/reflector, as shown by UL signal reception 1016. For example, UL signal transmission 1012 may reflect from an object back to a UE which transmitted UL signal transmission 1012 at time t2_1 (e.g., UE 1006). UL signal reception 1016 may occur a time period c1 before time t.

FIG. 10C illustrates a DL signal transmission 1008 from TRP 1004 (TRP2) via a DL beam at time t. As illustrated, DL signal transmission 1018 may be received by UE 1006 at time t1_2, as shown by DL signal reception 1020. Thus, there may be a propagation delay b2 from DL signal transmission 1018 and DL signal reception 1020. FIG. 10C also illustrates a UL signal transmission 1022 transmitted at time t3_2 which is a time period a2 before time t.

Generally, a2 may be equal to b2 if DL and UL transmissions have the same propagation delay. In some implementations, there may be one TA per serving cell, and thus, b1+a1 may be equal to b2+a2, which is equal to the configured TA. In other implementations, there may be multiple timing advance groups (TAGs) per serving cell, which allows b1+a1 to be equal to a first TA (TA1) and b2+a2 to be equal to a second TA (TA2).

As illustrated, UL signal transmission 1022 may be received by TRP 1004 at time t, as shown by UL signal reception 1024. The UL signal transmission 1022 may also be received by UE 1006 at time t2_2 via near field leakage or via a clutter/reflector, as shown by UL signal reception 1026. UL signal reception 1026 may occur a time period c2 before time t1.

Referring back to FIG. 10A, a UE may select one or more beam pairs to be reported to a BS. Each of the beam pairs may include a UL beam (e.g., for UL transmission from UE 1006 to TRP 1002) and a DL beam (e.g., for DL transmission from TRP 1004 to UE 1006). Conventionally, the selection of the one or more beam pairs may be based on an evaluation of various suitable signal quality thresholds, such as SI-received signal reception power (RSRP) (SI-RSRP) or signal-to-interference-plus-noise ratio (SINR), or both.

In certain aspects of the present disclosure, the UE may also consider a time difference constraint per beam pair. For example, the UE may consider whether a sum of reception timings of UL and DL signals is less than a cyclic prefix (CP) length (e.g., CP duration as described with respect to FIG. 3)

at the UE. Selection of a beam pair that meets this timing constraint may benefit the structured DL and UL transmissions at the UE to avoid leakage (e.g., for use cases of sub-band/partial overlapped frequency division multiplexed (FDMed) FD transmissions, FDMed channel state information-reference signal (CSI-RS) and sounding reference signal (SRS) FD transmissions, orthogonal UL and DL demodulation reference signals (DMRSs) FD transmissions). In other words, if a beam pair meets this timing constraint, the receptions of the UL signal and the DL signal may be orthogonal, reducing IR/leakage caused by UL signal transmission when a UE attempts to decode a DL signal.

For example, to achieve the timing synchronization for FD at the UE, and where TRP1 (TRP 1002) serves as a TRP receiving UL signal transmissions from UE 1006 and TRP2 (TRP 1004) serves as a TRP transmitting DL signal transmissions to UE 1006, a beam pair may be selected such that $t1\_2-t2\_1$ (which is equal to $b2+c1$) is less than the CP duration (e.g., CP duration of the symbol for the DL or UL signal), where $t1\_2$ is the time of DL signal reception 1020 (Trx_dl_2) at UE 1006 and $t2\_1$ is the time of UL signal reception 1016 (Trx_ul_1) at UE 1006.

On the other hand, if TRP2 (TRP 1004) serves as the TRP receiving UL signal transmissions from UE 1006 and TRP1 (TRP 1002) serves as the TRP transmitting DL signal transmission to UE 1006, the beam pair may be selected such that $t1\_1-t2\_2$ (which is equal to $b1+c2$) is less than the CP duration (e.g., of the symbol for the DL or UL signal), where $t1\_1$ is the time of the DL signal reception 1010 (Trx_dl_1) at UE 1006 and $t2\_2$ is the time of UL signal reception 1026 (Trx_ul_2) at UE 1006.

While only two TRPs are illustrated in FIG. 10A to facilitate understanding, more than two TRPs may be considered or chosen when reporting the beam pairs. For example, a first beam pair may include a first DL beam for a first TRP and a first UL beam for a second TRP, while a second beam pair may include a second DL beam for a third TRP and a second UL beam for a fourth TRP (or the first TRP). Per beam pair, as long as the UE has the receive (Rx) beam Trx_dl (DL reception) and Trx_ul (UL reception) timings, the UE may estimate whether $Trx\_dl\_i - Trx\_ul\_j$ is less than the CP duration per beam pair, i being an identifier of a TRP transmitting DL signal transmissions to UE 1006 and j being an identifier of a TRP receiving UL signal transmissions from UE 1006. For instance, there may be N TRPs, where N is an integer greater than or equal to two, to select the beam pair from. The UE may check any combination of (i, j) to pick the best qualified FD beam pair from a timing constraint perspective. Based on the timing differences between UL and DL receptions for each beam pair, the UE may recommend/signal the DL/UL TRPs (beam pairs) to the BS (e.g., gNB), allowing the BS to configure the UL TRP and DL TRP for FD communication.

Figure 11:
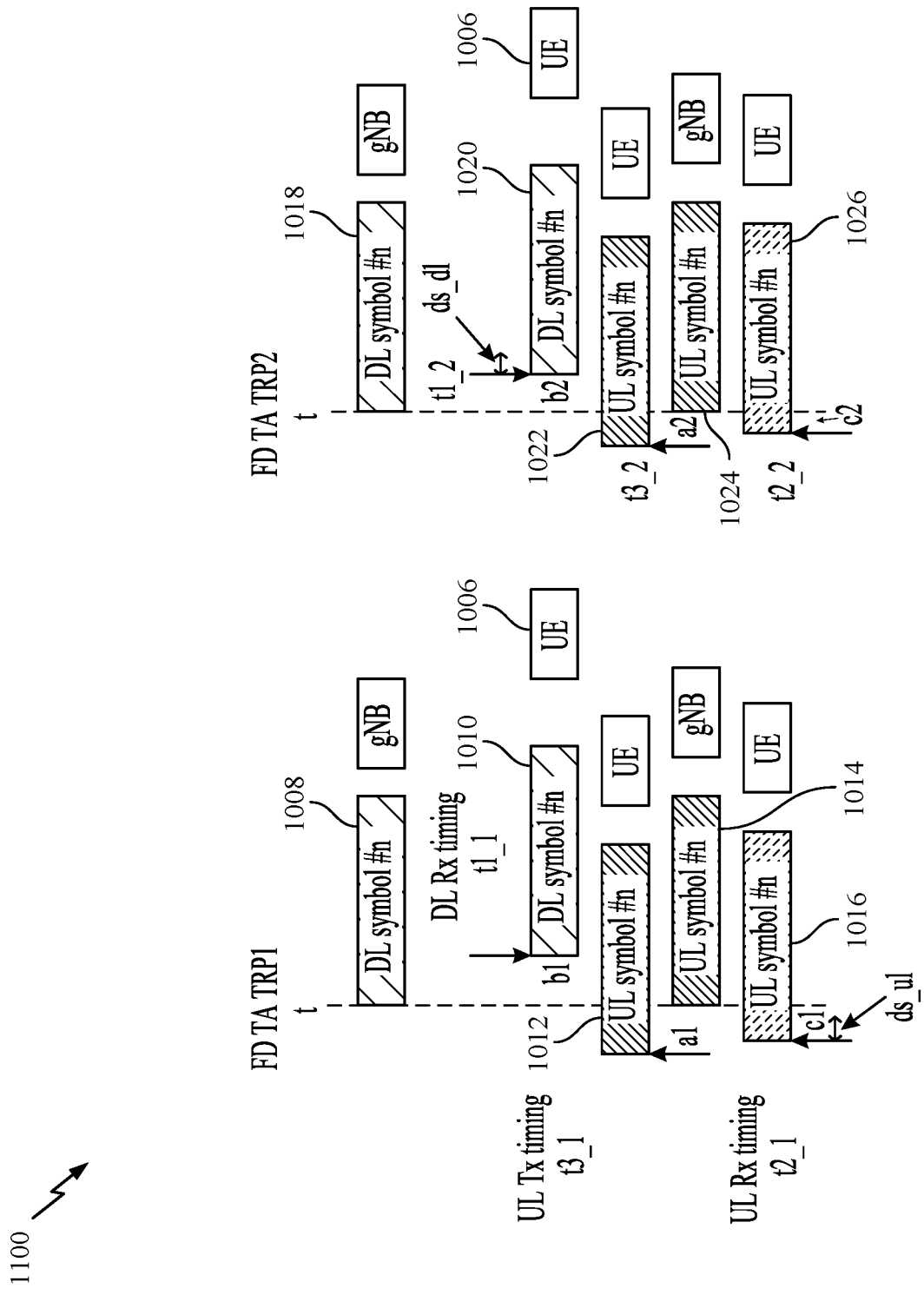
FIG. 11 illustrates a delay spread associated with UL and DL receptions at a UE, in accordance with certain aspects of the present disclosure.

FIG. 11 illustrates a delay spread associated with UL and DL receptions 1100 at a UE, in accordance with certain aspects of the present disclosure. For example, due to existence of a multipath channel, UL signal reception 1016 at UE 1006 may include a delay spread (ds_ul), and the DL signal reception 1020 at UE 1006 may include a delay spread (ds_dl). In certain aspects, the timing constraint may also consider the delay spread. For example, if TRP1 (TRP 1002) serves as the TRP receiving UL signal transmissions from UE 1006, and TRP2 (TRP 1004) serves as the TRP transmitting DL signal transmissions to UE 1006, then the beam pair may be selected such that $t1\_2-t2\_1$ (which is equal to $b2+c1$) is less than CP−ds_dl, where $t1\_2$ is the time of the DL signal reception 1020 (Trx_dl_2) at UE 1006 and $t2\_1$ is the time of the UL signal reception 1016 (Trx_ul_1) at UE 1006. ds_ul is included in c1 as shown in the figure.

Figure 12:
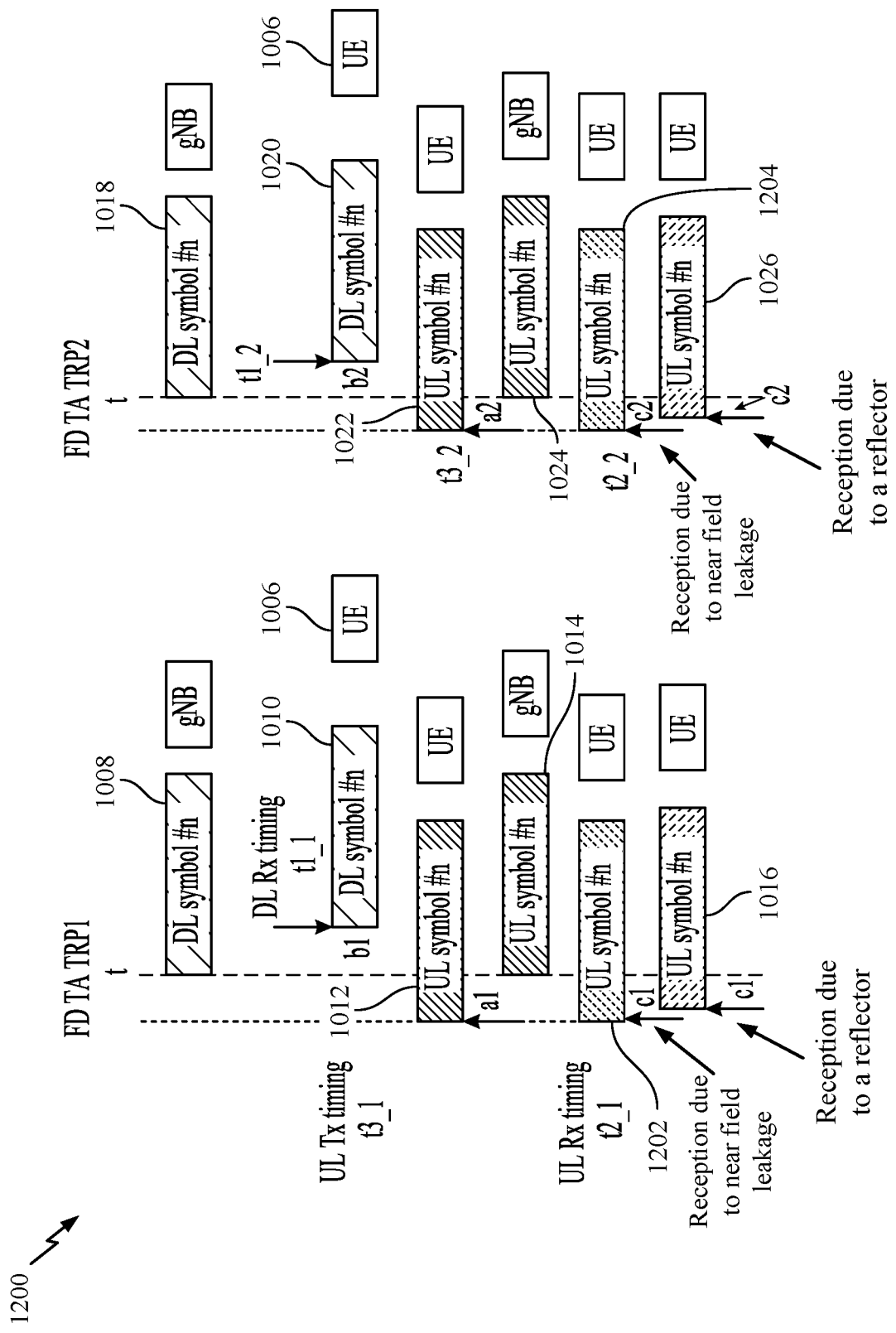
FIG. 12 illustrates UL signal reception via near field leakage, or via clutter/reflector, in accordance with certain aspects of the present disclosure.

FIG. 12 illustrates UL signal reception 1200 via near field leakage or via a clutter/reflector, in accordance with certain aspects of the present disclosure. For example, a first tap of a UL signal received at UE may be via near field leakage or via a clutter/reflector. A multipath channel may be represented by a delay line with N taps, a tap referring to a point on the delay line corresponding to a certain delay. When the first tap is via near field leakage, c1 may be about equal to a1 and c2 may be about equal to a2. For example, UL signal reception 1016 may be the reception of UL signal transmission 1012 at UE 1006 due to a reflector and UL signal reception 1026 may be reception of UL signal transmission 1022 at UE 1006 due to a reflector, whereas UL signal reception 1202 may be the reception of UL signal transmission 1012 at UE 1006 due to near field leakage, and UL signal reception 1204 may be the reception of UL signal transmission 1022 at UE 1006 due to near field leakage.

As illustrated, the time c1 of UL signal reception 1202 at UE 1006 due to near field leakage may be about the same as the time a1 of UL signal transmission 1012, and similarly, the time c2 of UL signal reception 1204 at UE 1006 due to near field leakage may be about the same as the time a2 of UL signal transmission 1022. When near field leakage is cancelled or lowered down to a non-detectable value by UE's implementation, the first tap is via a clutter/reflector, where c1 is less than a1 and c2 is less than a2, due to propagation delay.

Figure 13A:
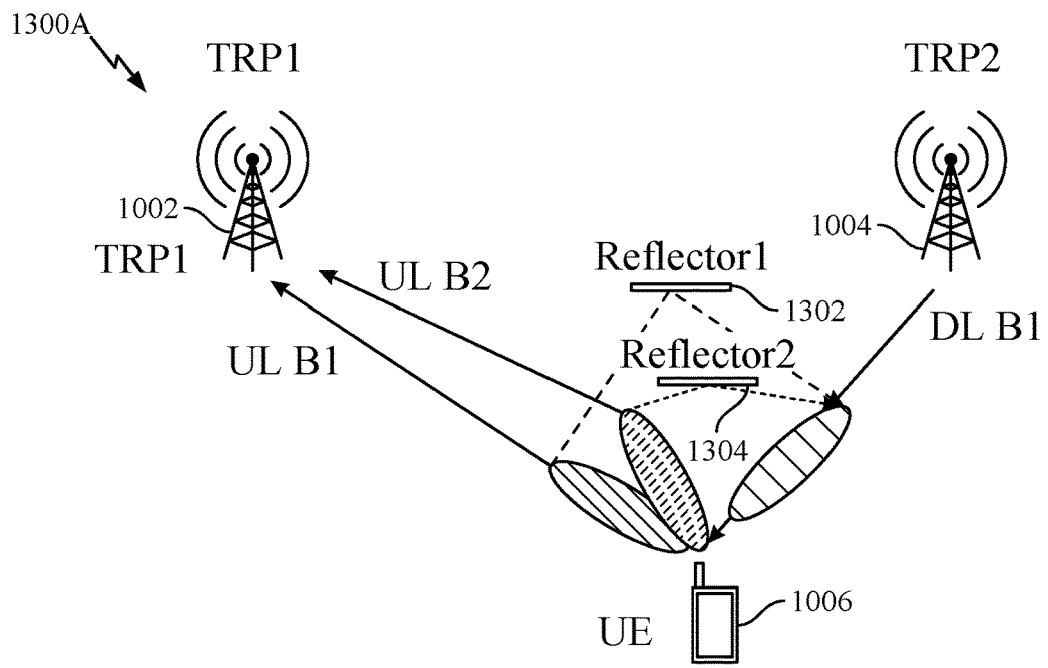
FIG. 13A illustrates a DL signal transmission from a TRP to a UE and a UL signal transmission from the UE to another TRP when reflectors are involved, in accordance with certain aspects of the present disclosure.
Figure 13B:
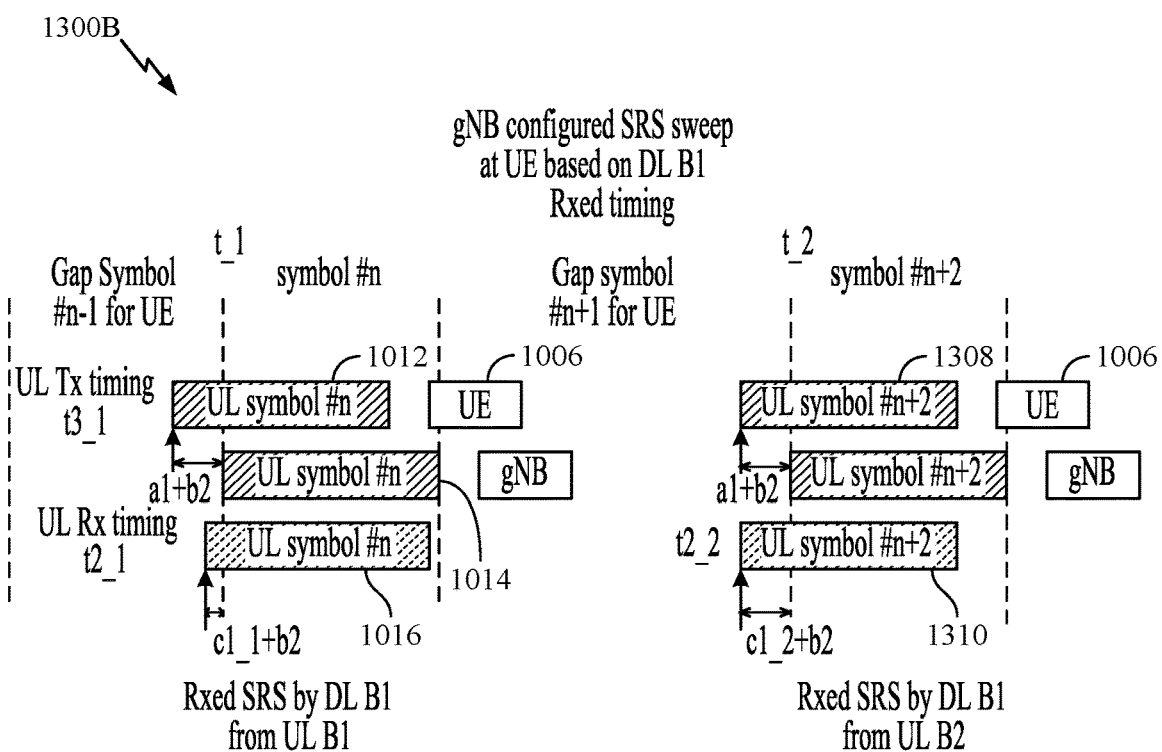
FIG. 13B illustrates example receiving times for UL signal reception from more than one UL beam when reflectors are involved, in accordance with certain aspects of the present disclosure.

FIG. 13A illustrates transmissions 1300A including a DL signal transmission from a TRP to a UE and a UL signal transmission from the UE to another TRP when reflectors are involved, in accordance with certain aspects of the present disclosure. FIG. 13B corresponds to FIG. 13A and illustrates example receiving times 1300B for UL signal reception from more than one UL beam when reflectors are involved, in accordance with certain aspects of the present disclosure. As illustrated, DL signaling may be received from TRP 1004 using a first DL beam (B1). As an example, among TRPs, where a first DL beam (B1) is selected for TRP 1004, UE 1006 may then sweep UL SRS beams for TRP 1002. For example, SRS may be transmitted using a first UL beam (B1) and a second UL beam (B2). As illustrated, the SRS transmitted via UL B1 may reflect off a reflector 1302, and the SRS transmitted via UL B2 may reflect off a reflector 1304. As illustrated in FIG. 13B, UL signal transmission 1012 may be via UL B1, and UL signal transmission 1308 (e.g., using symbol #n+2, after a gap symbol) may be via UL B2. UL signal reception 1016 may occur at $t2\_1$ (e.g., a time period $c1\_1+b2$ prior to time $t\_1$), and UL signal reception 1310 (e.g., reception of UL signal transmission 1308 due to reflection off reflector 1304) may occur at time $t2\_2$ (e.g., $c1\_2+b2$ prior to time $t\_2$). $t\_1$ and $t\_2$ are the DL receiving time at the UE.

Reflector 1302 may be farther from UE 1006 as compared to reflector 1304. Therefore, the time period $c1\_1$ may be less than time period $c1\_2$ since the propagation delay of UL signal transmission 1012 is greater than the propagation delay of UL signal transmission 1308. In other words, $c1\_1+b2$ is less than $c1\_2+b2$. Thus, UL B1 is a better UL beam candidate than UL B2, at least from a timing perspective.

As the propagation delay associated with UL B1 is greater than the propagation delay associated with UL B2, using UL B1 may cause less SI to DL B1, as compared to using UL B2. Moreover, from a timing perspective, the UE may select a beam pair that includes UL B1 to meet the timing constraint associated with the receptions of the UL and DL signals described herein. Generally, a UE may estimate whether $Trx\_dl\_i\_m - Trx\_ul\_j\_n$ is less than the CP duration per beam pair, where $Trx\_dl\_i\_m$ is the time of DL signal reception for a TRP index i and a beam index m, and $Trx\_ul\_j\_n$ is the time of UL signal reception for a TRP index j and a beam index n. In other words, i is the TRP index for a TRP transmitting DL signal transmissions, j is the TRP index for a TRP receiving UL signal transmissions, m is the DL beam index on each TRP, and n is the UL beam index on each TRP.

Figure 14A:
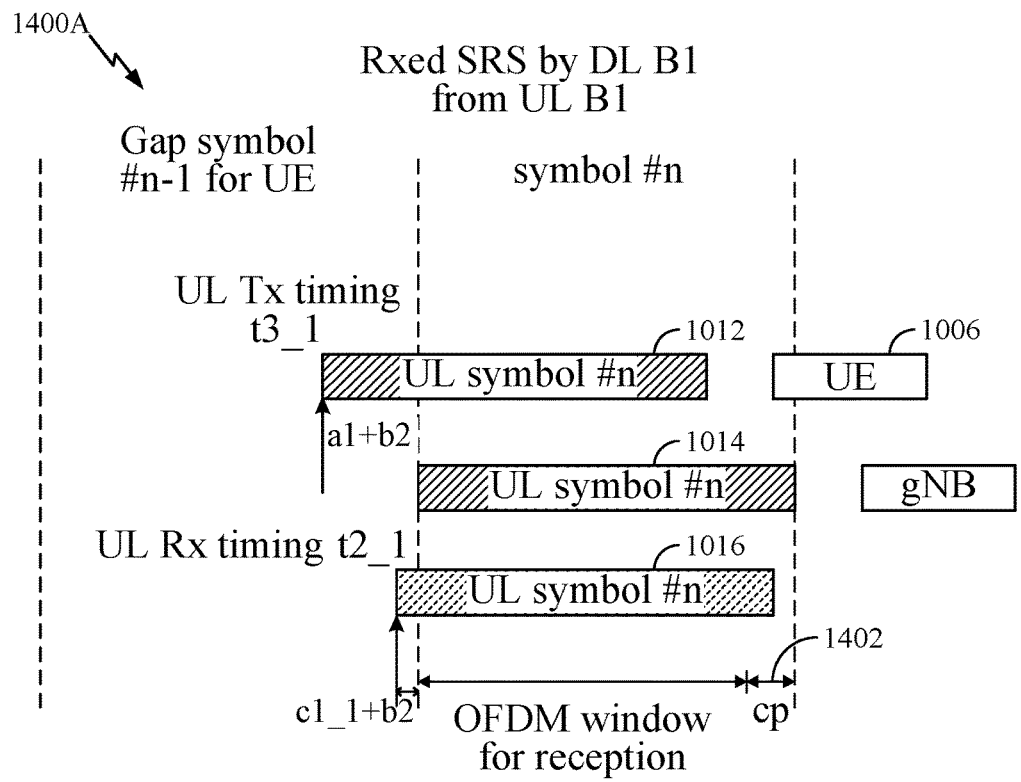
FIGS. 14A-14C illustrate operations for self-interference (SI) measurement at a UE, in accordance with certain aspects of the present disclosure.
Figure 14B:
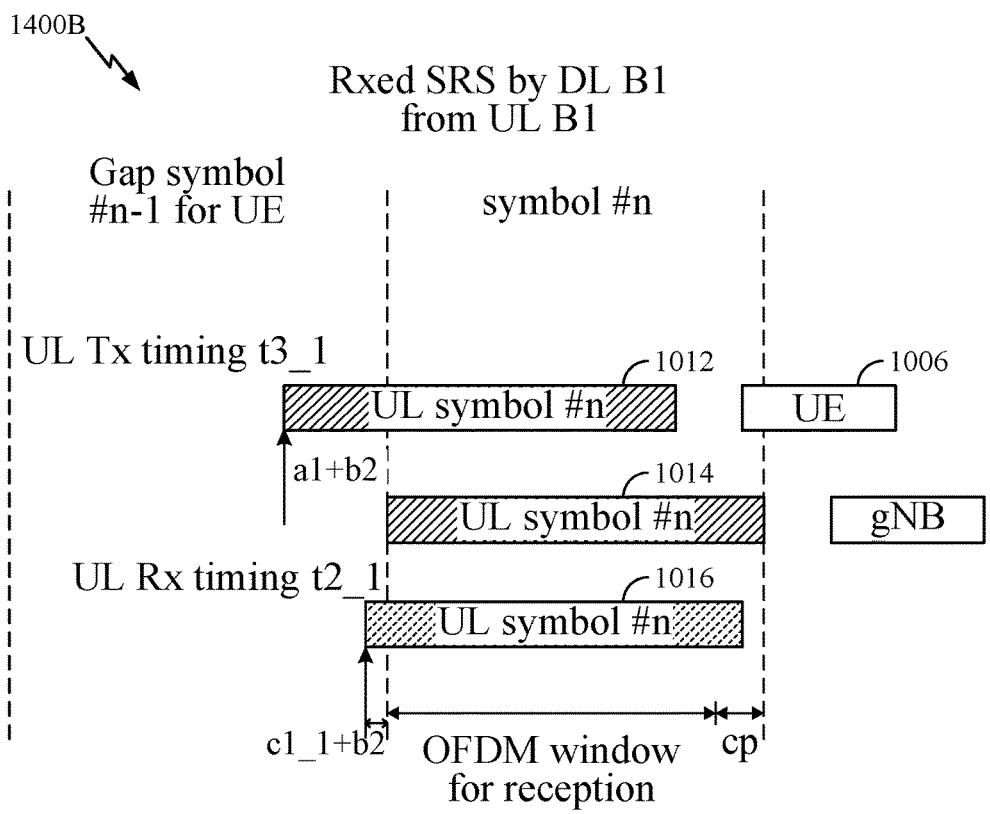
Figure 14C:
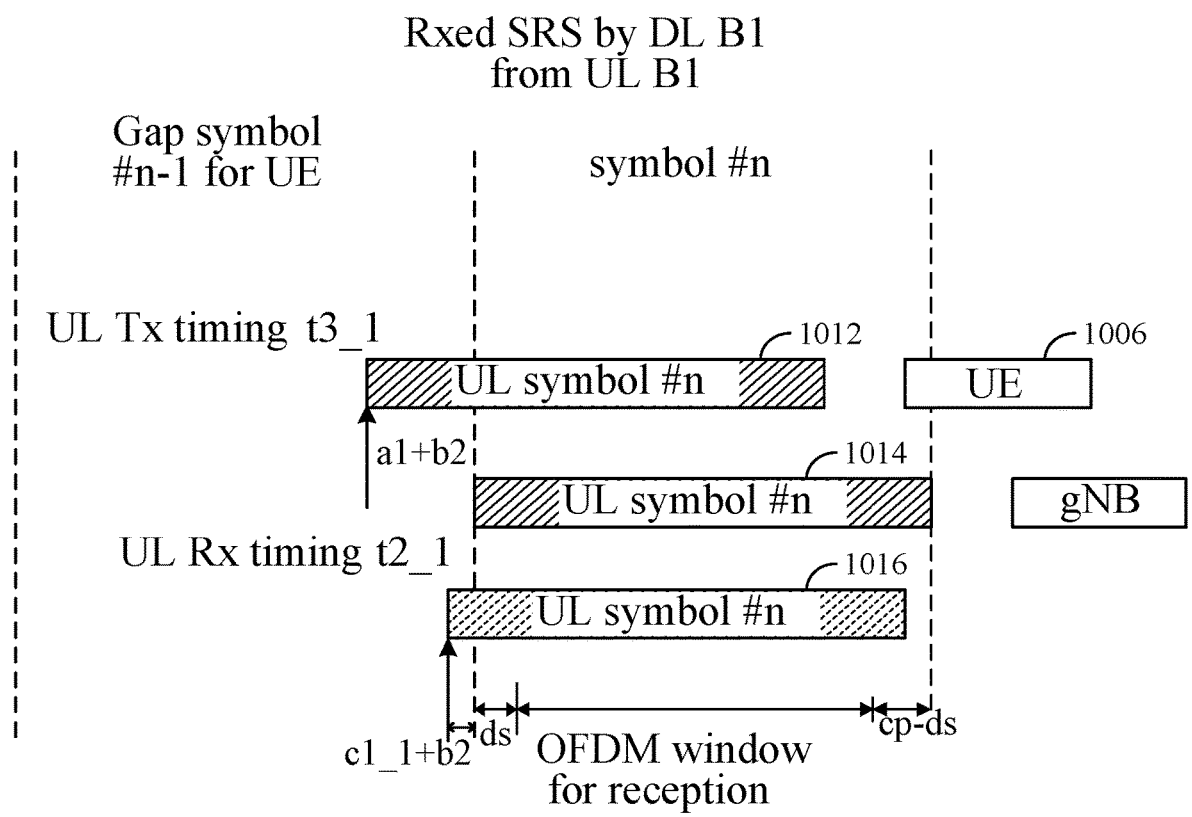

FIGS. 14A, 14B, and 14C illustrate operations 1400A, 1400B, and 1400C for SI measurement at a UE, in accordance with certain aspects of the present disclosure. As illustrated in FIG. 14A, c1_1+b2 may be less than CP duration 1402. Therefore, measurement of the energy of SRS (e.g., UL signal reception 1016) may provide an accurate assessment of SI. However, as illustrated in FIG. 14B, if c1_1+b2 is greater than CP duration 1402, measurement of the energy of SRS (e.g., UL signal reception 1016) may be inaccurate as a portion of the energy associated with the SRS may not be detected and measured within the OFDM window for reception by UE 1006. As illustrated in FIG. 14C, the timing constraint to facilitate an accurate SI measurement at the UE may consider the estimated DL delay spread. For example, as described herein, UE 1006 may consider whether c1_1+b2 is less than the CP duration minus the DL delay spread (ds) (e.g., is c1_1+b2<CP duration−ds_dl). In some aspects, UE 1006 may consider the maximum of (c1_1+b2 or the UL delay spread (ds_ul)) plus the DL delay spread to be less than the CP duration (e.g., maximum of (c1_1+b2) or (ds_ul+ds_dl)<CP duration).

Figure 15:
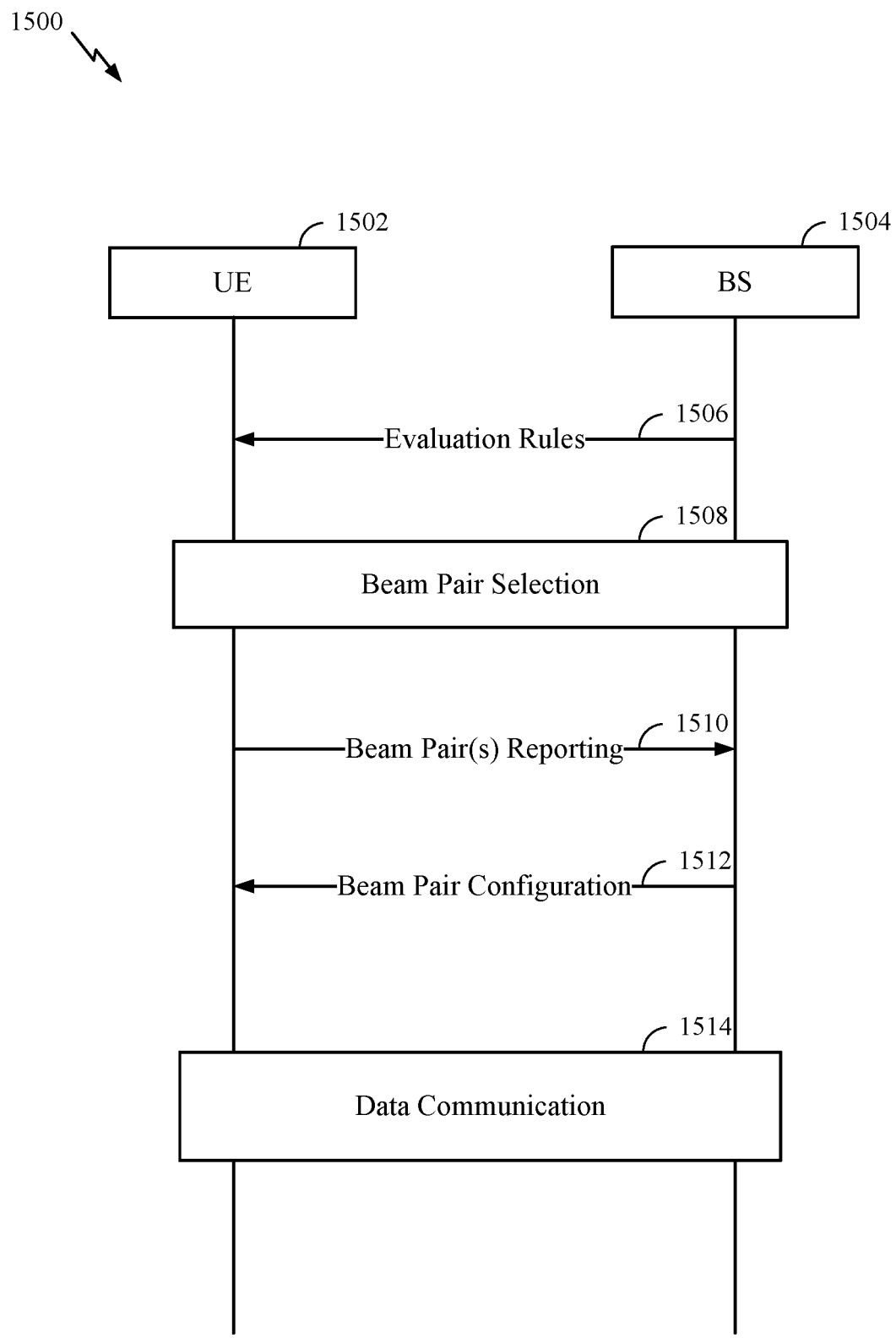
FIG. 15 is a call flow diagram illustrating example operations for beam pair selection, in accordance with certain aspects of the present disclosure.

FIG. 15 is a call flow diagram illustrating example operations 1500 for beam pair selection, in accordance with certain aspects of the present disclosure. As illustrated, BS 1504 may configure (e.g., indicate) evaluation rules 1506 for a beam pair measurement and selection procedure for UE 1502. For instance, BS 1504 may indicate whether beam pair reporting should consider a timing constraint or not. If considering the timing constraint during the beam pair measurement and selection procedure at UE 1502, UE 1502 may evaluate each beam pair, at block 1508, by considering the timing of UL and DL reception differences at the UE being less than the CP duration and the SINR/SI-RSRP. UE 1502 may then perform reporting of the beam pair(s) 1510.

Reporting of the beam pairs 1510 may be in accordance one of various suitable options. For example, as a first option, UE 1502 may report, for the beam pairs that satisfy the timing constraint, the top N best beam pair IDs with top highest SINRs, N being an integer equal to or greater than 1. BS 1504 may then select, from N beam pairs with the highest SINRs, one beam pair to be used by UE 1502 for communication and configure the UE with the beam pair accordingly. For example, one or more beam pairs may be selected from candidate beam pairs having the highest SINR (e.g., top two beam pairs are selected from candidate beam pairs based on the two beam pairs having the highest SINR among the candidate beam pairs).

As a second option, UE 1502 may report, for the beam pairs that satisfy the SINR/SI-RSRP threshold, the top N best beam pair identifiers (IDs) associated with beam pairs with top smallest timing differences (e.g., smallest timing difference between UL and DL receptions). For example, reporting one or more beam pairs may include reporting one or more beam pairs selected from candidate beam pairs having the smallest time difference (e.g., two beam pairs selected from candidate beam pairs based on the two beam pairs having the smallest time difference among the candidate beam pairs).

As a third option, UE 1502 may report the top N best beam pair IDs associated with beam pairs with top highest SINRs/SI-RSRPs, including timing difference values in the report, allowing BS 1504 to make a decision as to the beam pair to be configured using the time difference values. For example, one or more beam pairs may be selected from candidate beam pairs having the highest SINR (e.g., top two beam pairs of the candidate beam pairs based on the two beam pairs having the highest SINR among the candidate beam pairs) and reported along with timing difference values associated with the selected beam pairs.

As a fourth option, UE 1502 may report the top N best beam pair IDs with top smallest timing differences, including SINR/SI RSRP values in the report. For example, reporting one or more beam pairs may include reporting one or more beam pairs selected from candidate beam pairs having the smallest time difference (e.g., two beam pairs of the candidate beam pairs based on the two beam pairs having the smallest time difference among the candidate beam pairs), along with SINR/SI RSRP values associated with the selected beam pairs.

In some aspects, BS 1504 may configure UE 1502 (e.g., as part of evaluation rules 1506) with an option for UE 1502 to report. The configuration may be semi-persistent via radio resource control (RRC) signaling, or dynamic via medium access control (MAC)-control element (CE) or downlink control information (DCI).

Once the beam pairs are reported to BS 1504, BS 1504 may select the beam pair to be used and configure UE 1502 via the beam pair configuration 1512. The configured beam pair may then be used for FD communication at block 1514, as illustrated.

Example Wireless Communications Devices

Figure 16:
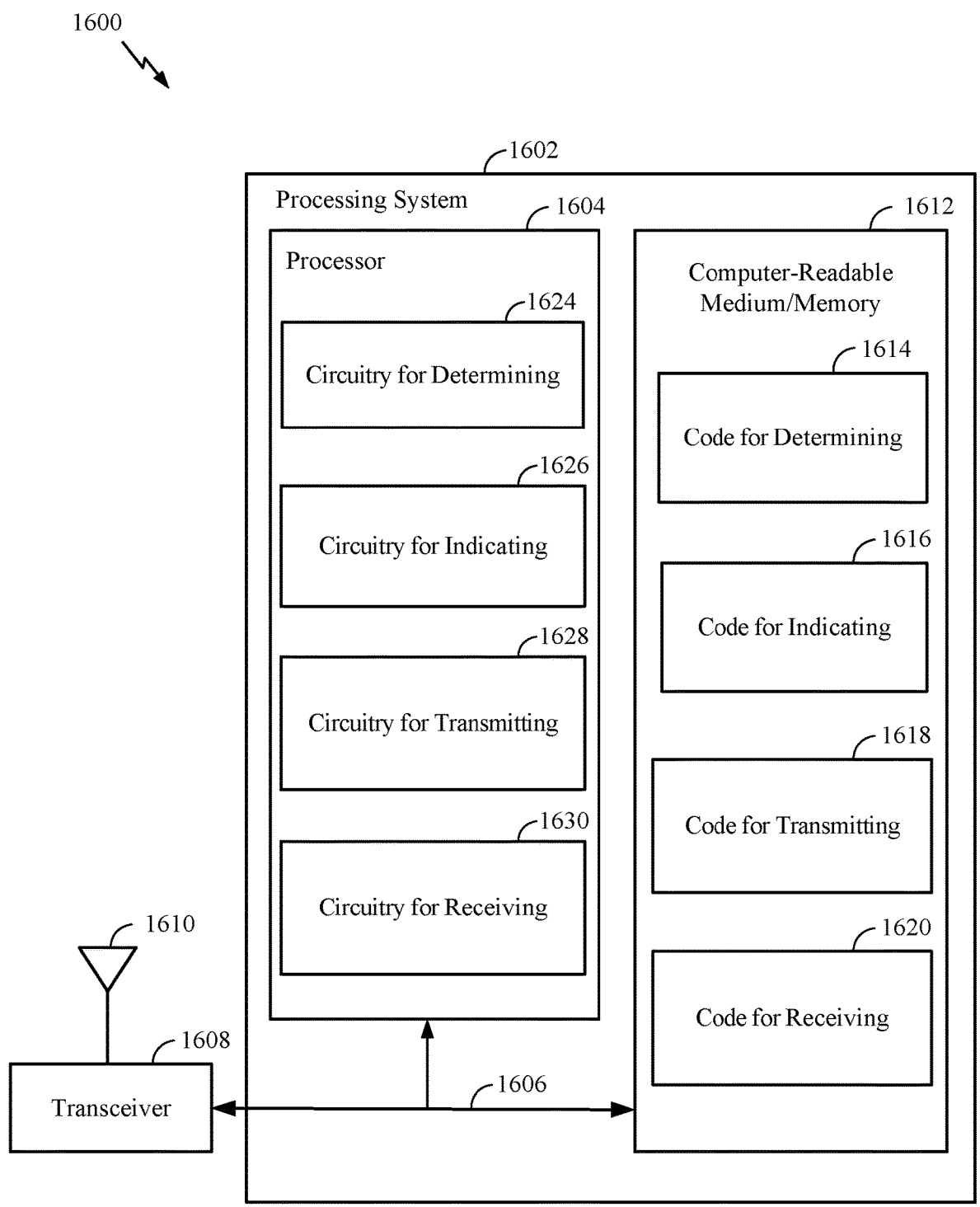
FIG. 16 illustrates a communications device that may include various components configured to perform operations for the techniques disclosed herein, in accordance with certain aspects of the present disclosure.

FIG. 16 illustrates a communications device 1600 that may include various components (e.g., corresponding to means-plus-function components) operable, configured, or adapted to perform operations for the techniques disclosed herein, such as the operations illustrated in FIG. 8. In some examples, communications device 1600 may be a BS, such as BS 110a as described with respect to FIGS. 1 and 2.

Communications device 1600 includes a processing system 1602 (e.g., corresponding to controller/processor 240) coupled to a transceiver 1608 (e.g., a transmitter and/or a receiver). Transceiver 1608 may correspond to one or more of transmit processor 220, TX MIMO processor 230, modulator/demodulator 232, receive processor 238, and MIMO detector 236 of FIG. 2. Transceiver 1608 is configured to transmit and receive signals for communications device 1600 via an antenna 1610, such as the various signals as described herein. Processing system 1602 may be configured to perform processing functions for communications device 1600, including processing signals received and/or to be transmitted by communications device 1600.

Processing system 1602 includes a processor 1604 coupled to a computer-readable medium/memory 1612 via a bus 1606. In certain aspects, computer-readable medium/memory 1612 is configured to store instructions (e.g., computer-executable code) that when executed by processor 1604, cause processor 1604 to perform the operations illustrated in FIG. 8 or other operations for performing the various techniques discussed herein for beam pair selection.

In certain aspects, computer-readable medium/memory 1612 stores code 1614 (an example means for) for determining; code 1616 (an example means for) for transmitting; and code 1618 (an example means for) for receiving.

In certain aspects, code 1614 for determining may include code for determining whether reporting of one or more beam pairs is to be based on a timing constraint. In certain aspects, code 1616 for transmitting may include code for transmitting a configuration for the reporting of the one or more beam pairs. In certain aspects, code 1616 for transmitting may include code for transmitting, to the UE, an indication of how reporting the one or more beam pairs is to be performed. In certain aspects, code 1618 for receiving may include code for receiving at least one report specifying one or more beam pairs.

In certain aspects, processor 1604 has circuitry configured to implement the code stored in computer-readable medium/memory 1612. Processor 1604 includes circuitry 1624 (an example means for) for determining; circuitry 1626 (an example means for) for transmitting; circuitry 1628 (an example means for) for receiving.

In certain aspects, circuitry 1624 for determining may include circuitry for determining whether reporting of one or more beam pairs is to be based on a timing constraint. In certain aspects, circuitry 1626 for transmitting may include circuitry for transmitting a configuration for the reporting of the one or more beam pairs. In certain aspects, circuitry 1626 for transmitting may include circuitry for transmitting, to the UE, an indication of how reporting the one or more beam pairs is to be performed. In certain aspects, circuitry 1628 for receiving may include circuitry for receiving at least one report specifying the one or more beam pairs.

In some cases, the operations illustrated in FIG. 8, as well as other operations described herein for beam pair selection, may be implemented by one or more means-plus-function components. For example, in some cases, such operations may be implemented by means for determining, means for transmitting (or means for outputting for transmission), and means for receiving (or means for obtaining).

In some cases, means for transmitting (or means for outputting for transmission) includes a transmitter (such as transmit processor 220) and/or an antenna(s) 234 of BS 110*a* illustrated in FIG. 2 and/or circuitry 1628 for transmitting of communications device 1600 in FIG. 16.

In some cases, means for receiving (or means for obtaining) includes a receiver (such as the receive processor 238) and/or an antenna(s) 234 of BS 110*a* illustrated in FIG. 2 and/or circuitry 1630 for receiving of communications device 1600 in FIG. 16.

In some cases, means for determining, includes a processing system, which may include one or more processors, such as receive processor 238, transmit processor 220, TX MIMO processor 230, and/or controller/processor 240 of BS 110*a* illustrated in FIG. 2 and/or processing system 1602 of communications device 1600 in FIG. 16.

Figure 17:
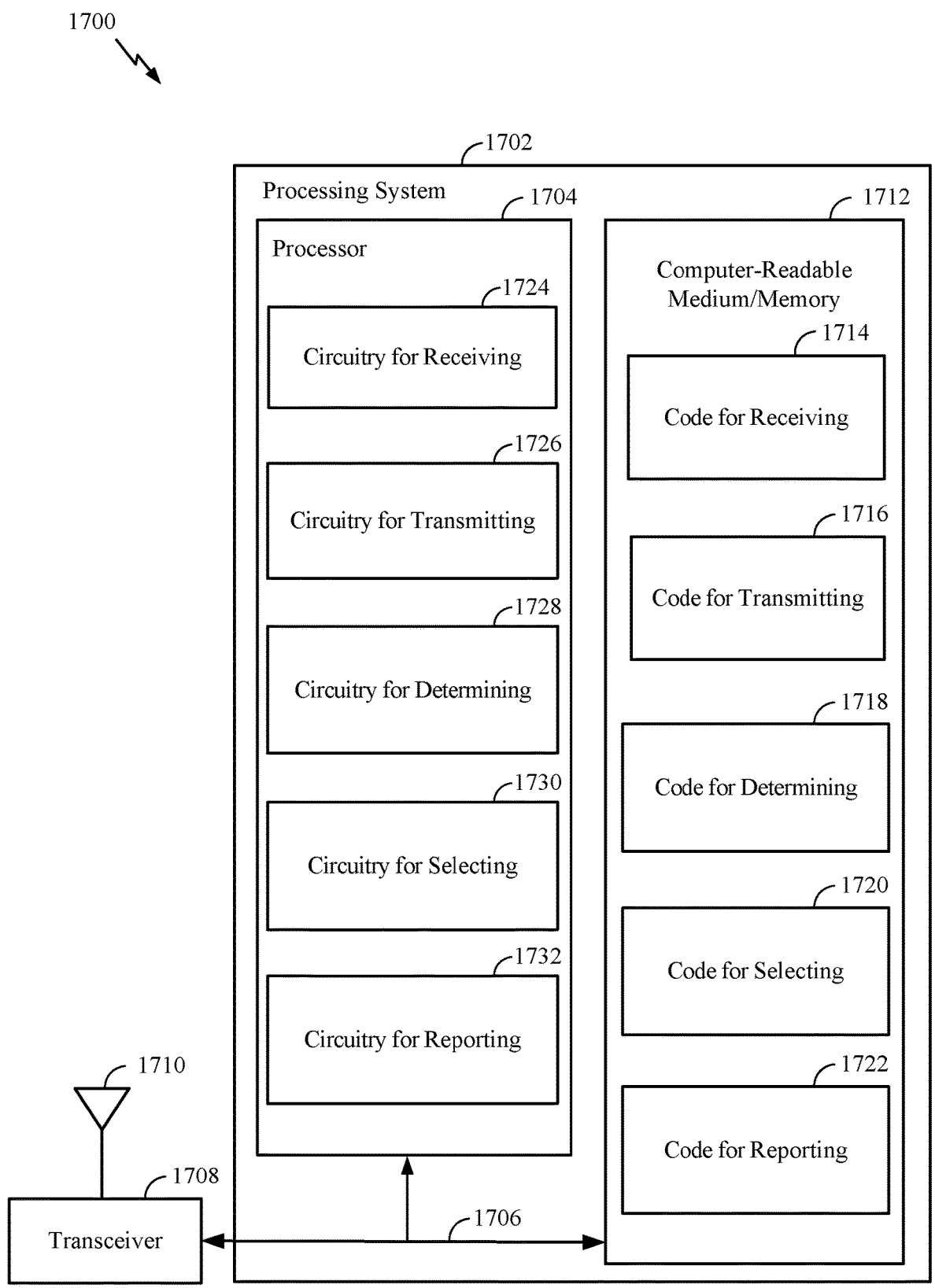
FIG. 17 illustrates a communications device that may include various components configured to perform operations for the techniques disclosed herein, in accordance with certain aspects of the present disclosure.

FIG. 17 illustrates a communications device 1700 that may include various components (e.g., corresponding to means-plus-function components) operable, configured, or adapted to perform operations for the techniques disclosed herein, such as the operations illustrated in FIG. 9. In some examples, communications device 1700 may be a UE, such as UE 120*a* as described with respect to FIGS. 1 and 2.

Communications device 1700 includes a processing system 1702 (e.g., corresponding to controller/processor 280) coupled to a transceiver 1708 (e.g., a transmitter and/or a receiver). Transceiver 1708 may correspond to one or more of transmit processor 264, TX MIMO processor 266, modulator/demodulator 254, receive processor 258, and MIMO detector 256 of FIG. 2. Transceiver 1708 is configured to transmit and receive signals for the communications device 1700 via an antenna 1710, such as the various signals as described herein. Processing system 1702 may be configured to perform processing functions for communications device 1700, including processing signals received and/or to be transmitted by communications device 1700.

Processing system 1702 includes a processor 1704 coupled to a computer-readable medium/memory 1712 via a bus 1706. In certain aspects, computer-readable medium/memory 1712 is configured to store instructions (e.g., computer-executable code) that when executed by processor 1704, cause processor 1704 to perform the operations illustrated in FIG. 9 or other operations for performing the various techniques discussed herein for beam pair selection.

In certain aspects, computer-readable medium/memory 1712 stores code 1714 (an example means for) for receiving; code 1716 (an example means for) for transmitting; code 1718 (an example means for) for determining; code 1720 (an example means for) for selecting; and code 1722 (an example means for) for reporting.

In certain aspects, code 1714 for receiving may include code for receiving, from a BS, an indication of whether the reporting of the one or more beam pairs is to be based on a timing constraint. In certain aspects, code 1716 for transmitting may include code for transmitting an UL signal or transmitting a report. In certain aspects, code 1718 for determining may include code for determining whether reporting of one or more beam pairs is to be based on a timing constraint. In certain aspects, code 1720 for selecting one or more beam pairs. In certain aspects, code 1722 for reporting may include code for reporting one or more beam pairs.

In certain aspects, processor 1704 has circuitry configured to implement the code stored in the computer-readable medium/memory 1712. Processor 1704 includes circuitry 1724 (an example means for) for transmitting/receiving; circuitry 1726 (an example means for) for determining; and circuitry 1728 (an example means for) for indicating.

In certain aspects, circuitry 1724 for receiving may include circuitry for receiving, from a BS, an indication of whether the reporting of the one or more beam pairs is to be based on a timing constraint. In certain aspects, circuitry 1726 for transmitting may include circuitry for transmitting an UL signal or transmitting a report. In certain aspects, circuitry 1728 for determining may include circuitry for determining whether reporting of one or more beam pairs is to be based on a timing constraint. In certain aspects, circuitry 1730 for selecting may include circuitry for selecting one or more beam pairs. In certain aspects, circuitry 1732 for reporting may include circuitry for reporting one or more beam pairs.

In some cases, the operations illustrated in FIG. 9, as well as other operations described herein for beam pair selection, may be implemented by one or more means-plus-function components. For example, in some cases, such operations may be implemented by means for generating, means for transmitting (or means for outputting for transmission), means for receiving (or means for obtaining), means for performing, and means for selecting.

In some cases, means for transmitting (or means for outputting for transmission) includes a transmitter (such as transmit processor 264) and/or an antenna(s) 252 of UE 120*a* illustrated in FIG. 2 and/or circuitry 1726 for transmitting of communications device 1700 in FIG. 17.

In some cases, means for receiving (or means for obtaining) includes a receiver (such as the receive processor 258) and/or an antenna(s) 252 of UE 120a illustrated in FIG. 2 and/or circuitry 1728 for receiving of communications device 1700 in FIG. 17.

In some cases, means for generating, means for performing, and means for selecting, includes a processing system, which may include one or more processors, such as receive processor 258, transmit processor 264, TX MIMO processor 266, and/or controller/processor 280 of UE 120a illustrated in FIG. 2 and/or processing system 1702 of communications device 1700 in FIG. 17.

Beam manager 112 and 122 may support wireless communication in accordance with examples as disclosed herein.

Beam manager 112 and 122 may be an example of means for performing various aspects described herein. Beam manager 112 and 122, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, Beam manager 112 and 122, or its sub-components, may be implemented in code (e.g., as configuration management software or firmware) executed by a processor, or any combination thereof. If implemented in code executed by a processor, the functions of Beam manager 112 and 122, or its sub-components may be executed by a general-purpose processor, a DSP, an ASIC, a FPGA or other programmable logic device.

In some examples, Beam manager 112 and 122 may be configured to perform various operations (e.g., receiving, determining, transmitting) using or otherwise in cooperation with the transceiver 1608 or 1708.

Beam manager 112 and 122, or its sub-components, may be physically located at various positions, including being distributed such that portions of functions are implemented at different physical locations by one or more physical components. In some examples, Beam manager 112 and 122, or its sub-components, may be a separate and distinct component in accordance with various aspects of the present disclosure. In some examples, Beam manager 112 and 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1: An apparatus for wireless communication by a user equipment (UE), comprising: a memory; and one or more processors coupled to the memory, the memory and the one or more processors being configured to: receive, form a base station (BS), an indication to report one or more beam pairs to be used for full-duplex (FD) communication based on a timing constraint, wherein the timing constraint comprises a constraint on a time difference between receptions, at the UE, of a downlink (DL) signal and an uplink (UL) signal for each of the one or more beam pairs; and transmit a report specifying the one or more beam pairs in accordance with the indication.

Clause 2: The apparatus of Clause 1, further comprising selecting the one or more beam pairs specified in the report from candidate beam pairs based on the one or more beam pairs having a lowest self-interference (SI) among the candidate beam pairs.

Clause 3: The apparatus of clause 1 or 2, wherein each of the one or more beam pairs comprises a DL beam and a UL beam.

Clause 4: The apparatus of any of Clauses 1-3, wherein the DL signal and the UL signal are transmitted and received on a same symbol.

Clause 5: The apparatus of any of Clauses 1-4, wherein the constraint on the time difference comprises the time difference being less than a duration of a cyclic prefix (CP) associated with the UL signal and the DL signal.

Clause 6: The apparatus of any of Clauses 1-5, wherein the constraint on the time difference comprises the time difference being less than a duration of a CP associated with the DL signal minus a delay spread associated with the DL signal.

Clause 7: The apparatus of any of Clauses 1-6, further comprising selecting the one or more beam pairs specified in the report from candidate beam pairs that satisfy the timing constraint.

Clause 8: The apparatus of Clause 7, wherein the one or more beam pairs are selected from the candidate beam pairs based on the one or more beam pairs having a highest signal to interference plus noise ratio (SINR) among the candidate beam pairs, wherein the interference in the SINR includes self-interference (SI) from a UL beam of the UE associated with the UL signal to a DL beam of the UE associated with the DL signal.

Clause 9: The apparatus of any of Clauses 1-8, further comprising selecting the one or more beam pairs specified in the report from candidate beam pairs that satisfy a signal quality threshold.

Clause 10: The apparatus of Clause 9, wherein the one or more beam pairs are selected from the candidate beam pairs based on the one or more beam pairs having a smallest time difference between the receptions of the DL signal and the UL signal.

Clause 11: The apparatus of any of Clauses 1-10, wherein the report further includes an indication of the time difference for each of the one or more beam pairs.

Clause 12: The apparatus of Clause 11, further comprising selecting the one or more beam pairs specified in the report from candidate beam pairs based on the one or more beam pairs having a highest SINR among the candidate beam pairs, wherein interference in the SINR includes SI from a UL beam of the UE associated with the UL signal to a DL beam of the UE associated with the DL signal.

Clause 13: The apparatus of any of Clauses 1-12, further comprising selecting the one or more beam pairs included in the report from candidate beam pairs based on the one or more beam pairs having a smallest time difference between the receptions of the DL signal and the UL signal among the candidate beam pairs, and wherein the one or more beam pairs are configured to be reported along with a signal quality value associated with each of the one or more beam pairs.

Clause 14: The apparatus of Clause 13, wherein the signal quality value comprises an SINR or an SI-RSRP.

Clause 15: The apparatus of any of Clauses 1-14, wherein the memory and the one or more processors are further configured to: receive the DL signal; transmit the UL signal; receive the UL signal via near field leakage or a reflector; and determine the time difference based on reception times of the DL signal and the received UL signal.

Clause 16: The apparatus of Clause 15, wherein the DL signal is received from a first transmission reception point (TRP) and the UL signal is transmitted to a second TRP or the first TRP.

Clause 17: The apparatus of any of Clauses 1-16, wherein the indication to report the one or more beam pairs indicates to: report the one or more beam pairs having a highest SINR among candidate beam pairs that satisfy the timing constraint; report the one or more beam pairs having a smallest time difference among candidate beam pairs that satisfy a signal quality threshold; report the one or more beam pairs having a highest SINR among candidate beam pairs along with an indication of the time difference for each of the one or more beam pairs; or report the one or more beam pairs having the smallest time difference among candidate beam pairs along with a signal quality value associated with each of the one or more beam pairs.

Clause 18: An apparatus for wireless communication by a base station (BS), comprising: a memory; and one or more processors coupled to the memory, the memory and the one or more processors being configured to: transmit, to a user equipment (UE), a configuration to report one or more beam pairs for full-duplex (FD) communication based on a timing constraint, wherein the timing constraint comprises a constraint on a time difference between receptions, at the UE, of a downlink (DL) signal and an uplink (UL) signal for each of the one or more beam pairs; and receive at least one report specifying the one or more beam pairs in accordance with the configuration.

Clause 19: The apparatus of Clause 18, wherein each of the one or more beam pairs comprises a DL beam and a UL beam.

Clause 20: The apparatus of Clause 18 or 19, wherein the DL signal and the UL signal are transmitted and received on a same symbol.

Clause 21: The apparatus of any of Clauses 18-20, wherein the constraint of the time difference comprises the time difference being less than a duration of a cyclic prefix (CP) associated with the UL signal and DL signal.

Clause 22: The apparatus of any of Clauses 18-21, wherein the constraint of the time difference comprises the time difference being less than a duration of a CP associated with the DL signal minus a delay spread associated with the DL signal.

Clause 23: The apparatus of any of Clauses 18-22, wherein the one or more beam pairs specified in the at least one report are selected by the UE from candidate beam pairs that satisfy the timing constraint.

Clause 24: The apparatus of Clause 23, wherein the one or more beam pairs are selected by the UE from the candidate beam pairs based on the one or more beam pairs having a highest signal to interference plus noise ratio (SINR), wherein the interference in the SINR includes self-interference (SI) from a UL beam associated with the UL signal to a DL beam associated with the DL signal.

Clause 25: The apparatus of any of Clauses 18-24, wherein the one or more beam pairs specified in the at least one report are selected by the UE from candidate beam pairs that satisfy a signal quality threshold.

Clause 26: The apparatus of Clause 25, wherein the one or more beam pairs are selected by the UE from the candidate beam pairs based on the one or more beam pairs having a smallest time difference between the receptions of the DL signal and the UL signal.

Clause 27: The apparatus of any of Clauses 18-26, wherein the report further includes an indication of the time difference for each of the one or more beam pairs.

Clause 28: The apparatus of Clause 27, wherein the one or more beam pairs specified in the at least one report are selected by the UE from candidate beam pairs based on the one or more beam pairs having a highest SINR among the candidate beam pairs, wherein interference in the SINR includes SI from a UL beam associated with the UL signal to a DL beam associated with the DL signal.

Clause 29: A method for wireless communication by a user equipment (UE), comprising: receiving, from a base station (BS), an indication to report one or more beam pairs to be used for full-duplex (FD) communication based on a timing constraint, wherein the timing constraint comprises a constraint on a time difference between receptions, at the UE, of a downlink (DL) signal and an uplink (UL) signal for each of the one or more beam pairs; and transmit a report specifying the one or more beam pairs in accordance with the indication.

Clause 30: A method for wireless communication by a base station (BS), comprising: transmitting, to a user equipment (UE), a configuration to report one or more beam pairs to be used for full-duplex (FD) communication based on a timing constraint, wherein the timing constraint comprises a constraint on a time difference between receptions, at a user equipment (UE), of a downlink (DL) signal and an uplink (UL) signal for each of the one or more beam pairs; and receiving at least one report specifying the one or more beam pairs in accordance with the configuration.

Clause 31: A method for wireless communication by a user equipment (UE), comprising: determining whether reporting of one or more beam pairs to be used for full-duplex communication is to be based on a timing constraint, wherein the timing constraint comprises a constraint on a time difference between receptions, at the UE, of a downlink signal and an uplink signal for each of the one or more beam pairs; and reporting the one or more beam pairs in accordance with the determination.

Clause 32: The method of Clause 31, further comprising receiving, from a base station, an indication of whether the reporting of the one or more beam pairs is to be based on the timing constraint.

Clause 33: The method of Clause 31 or 32, wherein each of the one or more beam pairs comprises a downlink beam and an uplink beam.

Clause 34: The method of any of Clauses 31-33, wherein the downlink signal and the uplink signal are transmitted and received on the same symbol.

Clause 35: The method of any of Clauses 31-34, wherein the constraint of the time difference comprises the time difference being less than a duration of a cyclic prefix (CP) associated with a downlink and uplink symbol associated with the uplink and downlink signals.

Clause 36: The method of any of Clauses 31-34, wherein the constraint of the time difference comprises the time difference being less than a duration of a CP associated with the a downlink and uplink symbol associated with the uplink and downlink signals minus a delay spread associated with the downlink signal.

Clause 37: The method of any of Clauses 31-36, wherein reporting the one or more beam pairs comprises reporting the one or more beam pairs from candidate beam pairs that satisfy the timing constraint.

Clause 38: The method of Clause 37, wherein the one or more beam pairs are selected from the candidate beam pairs having the highest signal to interference plus noise ratio (SINR), wherein the interference in the SINR includes self-interference from an uplink beam of the UE associated with the uplink signal to a downlink beam of the UE associated with the downlink signal.

Clause 39: The method of any of Clauses 31-38, wherein reporting the one or more beam pairs comprises reporting the one or more beam pairs having the smallest time difference between the receptions of the downlink signal and the uplink signal from candidate beam pairs that satisfy a signal quality threshold.

Clause 40: The method of Clause 39, wherein the signal quality threshold comprises an SINR threshold or a self-interference (SI) reference signal receive power (RSRP) threshold.

Clause 41: The method of any of Clauses 31-40, wherein reporting the one or more beam pairs comprises reporting the one or more beam pairs along with an indication of the time difference for each of the one or more beam pairs.

Clause 42: The method of Clause 41, wherein the one or more beam pairs are selected from candidate beam pairs having the highest SINR, wherein the interference in the SINR includes self-interference from an uplink beam of the UE associated with the uplink signal to a downlink beam of the UE associated with the downlink signal.

Clause 43: The method of any of Clauses 31-42, wherein reporting the one or more beam pairs comprises reporting the one or more beam pairs having the smallest time difference between the receptions of the downlink signal and the uplink signal along with a signal quality value associated with each of the one or more beam pairs.

Clause 44: The method of Clause 43, wherein signal quality value comprises an SINR or SI RSRP.

Clause 45: The method of any of Clauses 31-44, further comprising: receiving the downlink signal; transmitting the uplink signal; receiving the uplink signal via near field leakage or a reflector; and determining the time difference based on reception times of the downlink signal and the uplink signal.

Clause 46: The method of Clause 45, wherein the downlink signal is received from a first transmission reception point (TRP) and the uplink signal is transmitted to a second TRP.

Clause 47: The method of Clause 45 or 46, wherein the downlink signal is received from a TRP and the uplink signal is transmitted to the same TRP.

Clause 48: The method of any of Clauses 31-47, further comprising receiving, from a base station, an indication of whether reporting the one or more beam pairs is to be performed by: reporting the one or more beam pairs from candidate beam pairs that satisfy the timing constraint; reporting the one or more beam pairs having the smallest time difference from candidate beam pairs that satisfy a signal quality threshold; reporting the one or more beam pairs along with an indication of the time difference for each of the one or more beam pairs; or reporting the one or more beam pairs having the smallest time difference along with a signal quality value associated with each of the one or more beam pairs.

Clause 49: The method of Clause 48, wherein the indication is received via radio resource control (RRC), medium access control (MAC) control element (CE), or downlink control information (DCI).

Clause 50: A method for wireless communication by a base station, comprising: determining whether reporting of one or more beam pairs to be used for full-duplex communication is to be based on a timing constraint, wherein the timing constraint comprises a constraint on a time difference between receptions, at a user-equipment (UE), of a downlink signal and an uplink signal for each of the one or more beam pairs; indicating a configuration for the reporting of the one or more beam pairs in accordance with the determination; and receiving at least one report of the one or more beam pairs in accordance with the configuration.

Clause 51: The method of Clause 50, wherein each of the one or more beam pairs comprises a downlink beam and an uplink beam.

Clause 52: The method of Clause 50 or 51, wherein the downlink signal and the uplink signal are transmitted and received on the same symbol.

Clause 53: The method of any of Clauses 50-52, wherein the constraint of the time difference comprises the time difference being less than a duration of a cyclic prefix (CP) associated with a downlink and uplink symbol associated with the uplink and downlink signals.

Clause 54: The method of any of Clauses 50-52, wherein the constraint of the time different comprises the time difference being less than a duration of a CP associated with the a downlink and uplink symbol associated with the uplink and downlink signals minus a delay spread associated with the downlink signal.

Clause 55: The method of any of Clauses 50-54, wherein reporting the one or more beam pairs comprises reporting the one or more beam pairs from candidate beam pairs that satisfy the timing constraint.

Clause 56: The method of Clause 55, wherein the one or more beam pairs are selected from the candidate beam pairs having the highest signal to interference plus noise ratio (SINR), wherein the interference in the SINR includes self-interference from an uplink beam of the UE associated with the uplink signal to a downlink beam of the UE associated with the downlink signal.

Clause 57: The method of any of Clauses 50-56, wherein reporting the one or more beam pairs comprises reporting the one or more beam pairs having the smallest time difference between the receptions of the downlink signal and the uplink signal from candidate beam pairs that satisfy a signal quality threshold.

Clause 58: The method of Clause 57, wherein the signal quality threshold comprises a SINR threshold or a self-interference (SI) reference signal receive power (RSRP) threshold.

Clause 59: The method of any of Clauses 50-58, wherein reporting the one or more beam pairs comprises reporting the one or more beam pairs along with an indication of the time difference for each of the one or more beam pairs.

Clause 60: The method of Clause 59, wherein the one or more beam pairs are selected from candidate beam pairs having the highest SINR, wherein the interference in the SINR includes self-interference from an uplink beam of the UE associated with the uplink signal to a downlink beam of the UE associated with the downlink signal.

Clause 61: The method of any of Clauses 50-60, wherein reporting the one or more beam pairs comprises reporting the one or more beam pairs having the smallest time difference between the receptions of the downlink signal and the uplink signal along with a signal quality value associated with each of the one or more beam pairs.

Clause 62: The method of Clause 61, wherein signal quality value comprises a SINR or SI RSRP.

Clause 63: The method of any of Clauses 50-62, further comprising transmitting, to the UE, an indication of whether reporting the one or more beam pairs is to be performed by: reporting the one or more beam pairs from candidate beam pairs that satisfy the timing constraint; reporting the one or more beam pairs having the smallest time difference from candidate beam pairs that satisfy a signal quality threshold; reporting the one or more beam pairs along with an indication of the time difference for each of the one or more beam pairs; or reporting the one or more beam pairs having the smallest time difference along with a signal quality value associated with each of the one or more beam pairs.

Clause 64: The method of Clause 63, wherein the indication is transmitted via radio resource control (RRC), medium access control (MAC) control element (CE), or downlink control information (DCI).

Clause 65: An apparatus, comprising a memory; and one or more processors coupled to the memory, the memory and the one or more processors being configured to perform a method in accordance with any one of Clauses 31-64.

Clause 66: An apparatus, comprising means for performing a method in accordance with any one of Clauses 1-64.

Clause 67: A non-transitory computer-readable medium comprising executable instructions that, when executed by one or more processors of an apparatus, cause the apparatus to perform a method in accordance with any one of Clauses 1-64.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and base station (BS), next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by user equipments (UEs) with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 8 and 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by a user equipment (UE), comprising:
a memory; and
one or more processors coupled to the memory, the memory and the one or more processors being configured to:
receive, from a base station (BS), an indication to report one or more beam pairs to be used for full-duplex (FD) communication based on a timing constraint, wherein the timing constraint comprises a constraint on a time difference, for each of the one or more beam pairs, between a reception, at the UE, of a downlink (DL) signal and a reception, at the UE, of an uplink (UL) signal, wherein the reception of the UL signal at the UE is via at least one of near field leakage, clutter, or a reflector; and
transmit a report specifying the one or more beam pairs in accordance with the indication.

2. The apparatus of claim 1, further comprising selecting the one or more beam pairs specified in the report from candidate beam pairs based on the one or more beam pairs having a lowest self-interference (SI) among the candidate beam pairs.

3. The apparatus of claim 1, wherein each of the one or more beam pairs comprises a DL beam and a UL beam.

4. The apparatus of claim 1, wherein the DL signal and the UL signal are transmitted and received on a same symbol.

5. The apparatus of claim 1, wherein the constraint on the time difference comprises the time difference being less than a duration of a cyclic prefix (CP) associated with the UL signal and the DL signal.

6. The apparatus of claim 1, wherein the constraint on the time difference comprises the time difference being less than a duration of a cyclic prefix (CP) associated with the DL signal minus a delay spread associated with the DL signal.

7. The apparatus of claim 1, further comprising selecting the one or more beam pairs specified in the report from candidate beam pairs that satisfy the timing constraint.

8. The apparatus of claim 7, wherein the one or more beam pairs are selected from the candidate beam pairs based on the one or more beam pairs having a highest signal to interference plus noise ratio (SINR) among the candidate beam pairs, wherein the interference in the SINR includes self-interference (SI) from a UL beam of the UE associated with the UL signal to a DL beam of the UE associated with the DL signal.

9. The apparatus of claim 1, further comprising selecting the one or more beam pairs specified in the report from candidate beam pairs that satisfy a signal quality threshold.

10. The apparatus of claim 9, wherein the one or more beam pairs are selected from the candidate beam pairs based on the one or more beam pairs having a smallest time difference between the receptions of the DL signal and the UL signal.

11. The apparatus of claim 1, wherein the report further includes an indication of the time difference for each of the one or more beam pairs.

12. The apparatus of claim 11, further comprising selecting the one or more beam pairs specified in the report from candidate beam pairs based on the one or more beam pairs having a highest signal to interference plus noise ratio (SINR) among the candidate beam pairs, wherein interference in the SINR includes self-interference (SI) from a UL beam of the UE associated with the UL signal to a DL beam of the UE associated with the DL signal.

13. The apparatus of claim 1, further comprising selecting the one or more beam pairs specified in the report from candidate beam pairs based on the one or more beam pairs having a smallest time difference between the receptions of the DL signal and the UL signal among the candidate beam pairs, and wherein the one or more beam pairs are configured to be reported along with a signal quality value associated with each of the one or more beam pairs.

14. The apparatus of claim 13, wherein the signal quality value comprises a signal to interference plus noise ratio (SINR) or a self-interference reference signal receive power (SI-RSRP).

15. The apparatus of claim 1, wherein the memory and the one or more processors are further configured to:
   receive the DL signal;
   transmit the UL signal;
   receive the UL signal via the near field leakage or the reflector; and
   determine the time difference based on reception times of the DL signal and the received UL signal.

16. The apparatus of claim 15, wherein the DL signal is received from a first transmission reception point (TRP) and the UL signal is transmitted to a second TRP or the first TRP.

17. The apparatus of claim 1, wherein the indication to report the one or more beam pairs indicates to:
   report the one or more beam pairs having a highest signal to interference plus noise ratio (SINR) among candidate beam pairs that satisfy the timing constraint;
   report the one or more beam pairs having a smallest time difference among the candidate beam pairs that satisfy a signal quality threshold;
   report the one or more beam pairs having a highest SINK among candidate beam pairs along with an indication of the time difference for each of the one or more beam pairs; or
   report the one or more beam pairs having the smallest time difference among candidate beam pairs along with a signal quality value associated with each of the one or more beam pairs.

18. An apparatus for wireless communication by a base station (BS), comprising:
   a memory; and
   one or more processors coupled to the memory, the memory and the one or more processors being configured to:
      transmit, to a user equipment (UE), a configuration to report one or more beam pairs to be used for full-duplex (FD) communication based on a timing constraint, wherein the timing constraint comprises a constraint on a time difference, for each of the one or more beam pairs, between a reception, at the UE, of a downlink (DL) signal and a reception, at the UE, of an uplink (UL) signal, wherein the reception of the UL signal at the UE is via at least one of near field leakage, clutter, or a reflector; and
      receive at least one report specifying the one or more beam pairs in accordance with the configuration.

19. The apparatus of claim 18, wherein each of the one or more beam pairs comprises a DL beam and a UL beam.

20. The apparatus of claim 18, wherein the DL signal and the UL signal are transmitted and received on a same symbol.

21. The apparatus of claim 18, wherein the constraint of the time difference comprises the time difference being less than a duration of a cyclic prefix (CP) associated with the UL signal and DL signal.

22. The apparatus of claim 18, wherein the constraint of the time difference comprises the time difference being less than a duration of a cyclic prefix (CP) associated with the DL signal minus a delay spread associated with the DL signal.

23. The apparatus of claim 18, wherein the one or more beam pairs specified in the at least one report are selected by the UE from candidate beam pairs that satisfy the timing constraint.

24. The apparatus of claim 23, wherein the one or more beam pairs are selected by the UE from the candidate beam pairs based on the one or more beam pairs having a highest signal to interference plus noise ratio (SINR), wherein the interference in the SINR includes self-interference (SI) from a UL beam associated with the UL signal to a DL beam associated with the DL signal.

25. The apparatus of claim 18, wherein the one or more beam pairs specified in the at least one report are selected by the UE from candidate beam pairs that satisfy a signal quality threshold.

26. The apparatus of claim 25, wherein the one or more beam pairs are selected by the UE from the candidate beam pairs based on the one or more beam pairs having a smallest time difference between the receptions of the DL signal and the UL signal.

27. The apparatus of claim 18, wherein the report further includes an indication of the time difference for each of the one or more beam pairs.

28. The apparatus of claim 27, wherein the one or more beam pairs specified in the at least one report are selected by the UE from candidate beam pairs based on the one or more beam pairs having a highest signal to interference plus noise ratio (SINR) among the candidate beam pairs, wherein interference in the SINR includes self-interference (SI) from a UL beam associated with the UL signal to a DL beam associated with the DL signal.

29. A method for wireless communication by a user equipment (UE), comprising:
   receiving, from a base station (BS), an indication to report one or more beam pairs to be used for full-duplex (FD) communication based on a timing constraint, wherein the timing constraint comprises a constraint on a time difference, for each of the one or more beam pairs, between a reception, at the UE, of a downlink (DL) signal and a reception, at the UE, of an uplink (UL) signal, wherein the reception of the UL signal at the UE is via at least one of near field leakage, clutter, or a reflector; and
   transmitting a report specifying the one or more beam pairs in accordance with the indication.

30. A method for wireless communication by a base station (BS), comprising:
   transmitting, to a user equipment (UE), a configuration to report one or more beam pairs to be used for full-duplex (FD) communication based on a timing constraint, wherein the timing constraint comprises a constraint on a time difference, for each of the one or more beam pairs, between a reception, at the UE, of a downlink (DL) signal and a reception, at the UE, of an uplink (UL) signal, wherein the reception of the UL signal at the UE is via at least one of near field leakage, clutter, or a reflector; and
   receiving at least one report specifying the one or more beam pairs in accordance with the configuration.

* * * * *